United States Patent
Tanaka et al.

(10) Patent No.: US 10,433,247 B2
(45) Date of Patent: Oct. 1, 2019

(54) INFORMATION PROCESSING APPARATUS, COMMUNICATION SYSTEM, INFORMATION PROCESSING METHOD AND PROGRAM

(71) Applicant: SONY CORPORATION, Tokyo (JP)

(72) Inventors: Yusuke Tanaka, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 17 days.

(21) Appl. No.: 15/565,480

(22) PCT Filed: Mar. 31, 2016

(86) PCT No.: PCT/JP2016/060663
§ 371 (c)(1),
(2) Date: Oct. 10, 2017

(87) PCT Pub. No.: WO2016/203810
PCT Pub. Date: Dec. 22, 2016

(65) Prior Publication Data
US 2018/0084493 A1   Mar. 22, 2018

(30) Foreign Application Priority Data

Jun. 18, 2015 (JP) .................................. 2015-122518

(51) Int. Cl.
*H04L 12/28* (2006.01)
*H04W 52/02* (2009.01)
(Continued)

(52) U.S. Cl.
CPC ... *H04W 52/0212* (2013.01); *H04W 52/0206* (2013.01); *H04W 84/12* (2013.01);
(Continued)

(58) Field of Classification Search
None
See application file for complete search history.

(56) References Cited

U.S. PATENT DOCUMENTS 8,761,137 B2 * 6/2014 Yoneyama ........ H04W 52/0251
370/338
2006/0140135 A1 * 6/2006 Bonta ..................... H04L 45/04
370/254
(Continued)

FOREIGN PATENT DOCUMENTS

JP     2013-106348 A     5/2013
JP     2014-225848 A    12/2014
(Continued)

OTHER PUBLICATIONS

International Search Report dated Jun. 14, 2016 in PCT/JP2016/060663 filed Mar. 31, 2016.
(Continued)

*Primary Examiner* — Sithu Ko
(74) *Attorney, Agent, or Firm* — Xsensus LLP

(57) ABSTRACT

An information processing apparatus includes a control section, and can temporarily pause at least some of its own functions. When the control section provided in the information processing apparatus is to temporarily pause at least some of its own functions, the control section performs control for setting a function temporary pause period within which at least some of functions of a different apparatus are to be temporarily paused. Further, the control section provided in the information processing apparatus performs control for notifying the different apparatus of the set function temporary pause period. Power consumption of the information processing apparatus can be reduced.

10 Claims, 17 Drawing Sheets

EXAMPLE OF SETTING OF FUNCTION TEMPORARY PAUSE STATE

(51) Int. Cl.
*H04W 84/12* (2009.01)
*H04W 88/08* (2009.01)

(52) U.S. Cl.
CPC ............. *H04W 88/08* (2013.01); *Y02D 70/10* (2018.01); *Y02D 70/142* (2018.01); *Y02D 70/164* (2018.01); *Y02D 70/21* (2018.01); *Y02D 70/22* (2018.01)

(56) References Cited

U.S. PATENT DOCUMENTS

| | | | | |
|---|---|---|---|---|
| 2006/0285527 A1* | 12/2006 | Gao | .................. | H04W 52/0216 370/338 |
| 2007/0159992 A1* | 7/2007 | Kim | .................. | H04W 52/0216 370/311 |
| 2009/0279464 A1* | 11/2009 | Kakani | ............. | H04W 52/0216 370/311 |
| 2010/0325459 A1* | 12/2010 | Kangude | ........... | H04W 52/0225 713/323 |
| 2012/0218941 A1 | 8/2012 | Nakatsugawa | | |
| 2012/0315885 A1* | 12/2012 | Shintani | ................ | H04W 60/02 455/418 |
| 2013/0124894 A1 | 5/2013 | Cho | | |
| 2014/0029494 A1* | 1/2014 | Sundaram | ......... | H04W 52/0235 370/311 |
| 2014/0119252 A1* | 5/2014 | Kella | ................ | H04W 52/0216 370/311 |
| 2016/0234626 A1* | 8/2016 | Ray | ....................... | H04L 67/104 |
| 2017/0013671 A1* | 1/2017 | Xu | ........................ | H04W 16/32 |

FOREIGN PATENT DOCUMENTS

| | | |
|---|---|---|
| WO | 2011/055437 A1 | 5/2011 |
| WO | 2011/102280 A1 | 8/2011 |

OTHER PUBLICATIONS

Samsung, "On the extended DRX approach for UEPCOP," 3GPP TSG-RAN WG2#82 R2-131792, May 2013, pp. 1-4.
Wi-Fi Alliance Technical Committee P2P Task Group, "W-Fi Peer-to-Peer (P2P) Technical Specification," Wi-Fi Alliance, Version 1.2, 2010, 159 pages.

\* cited by examiner

EXAMPLE OF IE THAT NOTIFIES THAT FUNCTION TEMPORARY PAUSE FUNCTION IS PROVIDED

EXAMPLE OF IE FOR NOTIFICATION OF FUNCTION TEMPORARY PAUSE PERIOD

EXAMPLE OF SETTING OF FUNCTION TEMPORARY PAUSE STATE

FIG. 7

EXAMPLE OF OPERATION OF FUNCTION TEMPORARY PAUSE PERIOD SETTING PROCESS

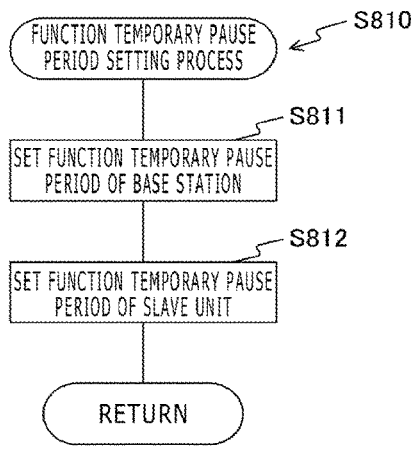

FIG. 8

EXAMPLE OF RELATION BETWEEN NUMBER X OF SLAVE UNITS CONNECTED TO BASE STATION AND FUNCTION TEMPORARY PAUSE PERIOD P

| NUMBER X OF SLAVE UNITS CONNECTED TO BASE STATION | FUNCTION TEMPORARY PAUSE PERIOD P |
|---|---|
| $1 \leq X < N1$ | $P1min \leq P \leq P1max$ |
| $N1 \leq X < N2$ | $P2min \leq P \leq P2max$ <br> ($P2min \leq P1min$, $P2max \leq P1max$) |
| $N2 \leq X < N3$ | $P3min \leq P \leq P3max$ <br> ($P3min \leq P2min$, $P3max \leq P2max$) |
| ... | ... |
| $Nn-1 \leq X < Nn$ | $Pnmin \leq P \leq Pnmax$ <br> ($Pnmin \leq Pn-1min$, $Pnmax \leq Pn-1max$) |

EXAMPLE OF SETTING OF FUNCTION TEMPORARY PAUSE STATE

EXAMPLE OF SETTING OF FUNCTION TEMPORARY PAUSE STATE

INFORMATION PROCESSING APPARATUS, COMMUNICATION SYSTEM, INFORMATION PROCESSING METHOD AND PROGRAM

TECHNICAL FIELD

The present technology relates to an information processing apparatus. Particularly, the present technology relates to an information processing apparatus, a communication system and an information processing method for performing exchange of information utilizing wireless communication and a program for causing a computer to execute the method.

BACKGROUND ART

A wireless communication technology for performing exchange of information utilizing wireless communication has been available. For example, a communication method for performing exchange of information between different information processing apparatus utilizing a wireless local area network (LAN) has been proposed. Further, as apparatus that perform exchange of information utilizing wireless communication, mobile bodies such as a portable telephone set and a smartphone are available.

Such mobile bodies frequently have a battery as a power supply. Therefore, the mobile bodies are limited in operating time. Thus, technologies for reducing power consumption have been proposed in order to extend the operating time.

For example, a technology for reducing, when a mobile body need not perform communication, the power consumption by entering a power saving state in which transmission and reception of a signal are not performed and the power consumption is low has been proposed. For example, in Institute of Electrical and Electronic Engineers (IEEE) 802.11 that is a standard specification for a wireless LAN that is spread widely, a protocol for notifying a master unit that a slave unit enters a power saving state is defined. Here, it has been assumed that the master unit is linked to a fixed power supply. However, in recent years, a mobile body that is driven by a battery sometimes has a function of a base station. Therefore, a technology for reducing the power consumption by causing a base station to enter a power saving state is important.

As a technology for making it possible for a base station to enter a power saving state, a standard for allowing different Wireless Fidelity (Wi-Fi)-incorporating apparatus to be directly connected to each other by wireless connection without by way of a router has been proposed (for example, refer to NPL 1). This standard is a standard prescribed by Wi-Fi Alliance.

In this standard, protocols for allowing a wireless apparatus (group owner (GO)) that plays a role of a base station to enter a power saving state are defined. As one of such protocols, a protocol called notice of absence (NoA) is defined. This NoA indicates a procedure for notifying a slave unit of a period within which a GO is to enter a power saving state in advance using a Beacon or the like.

Further, principally for a 3rd Generation Partnership Project (3GPP)-based system, a decision method by which a base station enters a power saving state has been proposed (for example, refer to PTL 1). According to the decision method, a base station searches for a surrounding base station that operates in synchronism with the own apparatus and decides, from an intensity and an orientation of a signal received from the surrounding base station, whether or not the own apparatus is to enter a power saving state. Since a base station that is to enter a power saving state searches for a surrounding base station in advance in this manner, a slave unit that is connected to the base station that has entered the power saving state can establish a new connection to a surrounding different base station.

CITATION LIST

Non Patent Literature

[NPL 1]
Wi-Fi Peer-to-Peer (P2P) Technical Specification

Patent Literature

[PTL 1]
JP 2014-225848A

SUMMARY

Technical Problems

With the related art described above, a base station can enter a power saving state.

However, in the standard of NPL 1, it is prescribed that, if slave units connected to a base station include even one slave unit that is not compatible with the standard, then the base station cannot enter a power saving state. Therefore, for example, where a plurality of slave units exist, if they include an old slave unit or units that are not compatible with the standard, then a power saving state cannot be entered.

Further, in the technology of PTL 1, in order for a base station to enter a power saving state, around the base station that enters a power saving state, a different base station that is to substitute for the base station must exist. However, it is supposed that, when a mobile body functions as a base station, a different base station that is connectable may not exist around the mobile body. Further, according to the technology of PTL 1, a surrounding base station that acts as a substitute for a base station that enters a power saving state cannot enter a power saving state.

Therefore, for example, also in a case in which a slave unit that does not have a specific function is connected, in a case in which a connectable base station does not exist in the surroundings or in a like case, it is important for a base station to enter a power saving state to reduce the power consumption of individual apparatus.

The present technology has been created in view of such a situation as described above, and it is an object of the present technology to reduce the power consumption in an information processing apparatus.

Solution to Problems

The present technology has been created in order to solve the problems described above, and a first aspect of the present technology is an information processing apparatus including a control section that performs control for setting, when at least some of functions of the own apparatus is to be temporarily paused, a function temporary pause period within which at least some of functions of a different apparatus is to be temporarily paused and notifying the different apparatus of the function temporary pause period, and an information processing method for the information processing apparatus and a program for causing a computer to execute the method. This brings about action that, when at least some of functions of the own apparatus is to be temporarily paused, a function temporary pause period within which at least some of functions of the different apparatus is to be temporarily paused is set, and a notification of the function temporary pause period is issued to the different apparatus.

Further, in this first aspect, the control section may perform control for acquiring information regarding the different apparatus and setting the function temporary pause period based on the information. This brings about action that information regarding the different apparatus is acquired and the function temporary pause period is set on the basis of the information.

Further, in this first aspect, the information may be at least one of presence or absence of a function for setting the function temporary pause period in the different apparatus, the number of different apparatus connected to the information processing apparatus, an adjustment request for the function temporary pause period from the different apparatus, resending information of data transmitted from the different apparatus, a modulation method or an encoding method used for the data transmission by the different apparatus, reception power of the data transmitted from the different apparatus, information regarding a period of time after an end timing of the function temporary pause period set in a preceding operation cycle till a reception timing of the data transmitted from the different apparatus, and information of data transmitted from the different apparatus regarding an order associated with previous data and subsequent data. This brings about action that the function temporary pause period is set on the basis of at least one of the kinds of information.

Further, in this first aspect, the control section may perform control for setting, based on the information, the function temporary pause period to be set after the function temporary pause period set in response to the notification is cancelled. This brings about action that the function temporary pause period to be set after the function temporary pause period set to the different apparatus in response to the notification from the information processing apparatus is cancelled is set on the basis of the information.

Further, in this first aspect, the temporary pause of the information processing apparatus may be at least one of a temporary pause for allowing the information processing apparatus to enter a power saving state, a temporary pause of functions other than a function for temporarily pausing a function of a group to which the information processing apparatus belongs while allowing a function of a group different from the group to be carried out, and a temporary pause of functions other than a function for temporarily pausing a function of the group to which the information processing apparatus belongs while searching for a new group to which the information processing apparatus is to belong. This brings about action that the temporary pause of the information processing apparatus is at least one of the temporary pauses.

Further, in this first aspect, the control section may perform control for transmitting a frame for notification of the function temporary pause period to the different apparatus that has a specific function capable of understanding the frame. This brings about action that the frame for notification of the function temporary pause period is transmitted to the different apparatus that has the specific function capable of understanding the frame.

Further, in this first aspect, when information regarding presence or absence of the specific function is not acquired from the different apparatus connected to the information processing apparatus, the control section may perform control for requesting the different apparatus for the information regarding presence or absence of the specific function. This brings about action that, when the information regarding presence or absence of the specific function is not acquired from the different apparatus connected to the information processing apparatus, a request for the information regarding presence or absence of the specific function is issued.

Further, in this first aspect, where a plurality of different apparatus are connected to the information processing apparatus, the control section may perform the notification of the function temporary pause period and the request for the information regarding presence or absence of the specific function by one of a first method by which the notification and the request are performed individually for each of the different apparatus and a second method by which the notification and the request are performed collectively for the plurality of different apparatus. This brings about action that, where a plurality of different apparatus are connected to the information processing apparatus, the notification of the function temporary pause period and the request for the information regarding presence or absence of the specific function are performed by one of the first method by which the notification and the request are performed individually for each of the different apparatus and the second method by which the notification and the request are performed collectively for the plurality of different apparatus.

Meanwhile, a second aspect of the present technology is an information processing apparatus including a control section that performs control for setting, based on a function temporary pause period notified, when at least some of functions of a different apparatus is to be temporarily paused, from the different apparatus, a period within which at least some of functions of the own apparatus is to be temporarily paused and notifying the different apparatus of an adjustment request for the function temporary pause period, and an information processing method for the information processing apparatus and a program for causing a computer to execute the method. This brings about action that a period within which at least some of the functions of the own apparatus i*s to be temporarily paused is set on the basis of the function temporary pause period notified from the different apparatus and a notification of an adjustment request for the function temporary pause period is issued to the different apparatus.

Further, in this second aspect, the control section may notify the different apparatus of at least one of an adjustment request based on traffic of the information processing apparatus, an adjustment request based on a request from an upper layer to the information processing apparatus, an adjustment request based on the amount of data buffered in the information processing apparatus and an adjustment request based on a power supply state of the information processing apparatus. This brings about action that a notification of at least one of an adjustment request based on traffic of the information processing apparatus, an adjustment request based on a request from an upper layer to the information processing apparatus, an adjustment request based on the amount of data buffered in the information processing apparatus and an adjustment request based on the power supply state of the information processing apparatus is issued to the different apparatus.

Further, in this second aspect, after the function temporary pause period is cancelled, the control section may decide, based on at least one of traffic of the information processing apparatus, a request from an upper layer to the information processing apparatus, the amount of data buffered in the information processing apparatus and a power supply state of the information processing apparatus, one of reduction, extension and maintenance of the function temporary pause period and performs control for notifying the different apparatus of a substance of the decision as an adjustment request for the function temporary pause period. This brings about action that, after the function temporary pause period is cancelled, based on at least one of traffic of the information processing apparatus, a request from an upper layer to the information processing apparatus, the amount of data buffered in the information processing apparatus and the power supply state of the information processing apparatus, one of reduction, extension and maintenance of the function temporary pause period is decided and a notification of the substance of the decision is issued as an adjustment request for the function temporary pause period to the different apparatus.

Further, a third aspect of the present technology is a communication system including a first information processing apparatus that sets, when at least some of functions of the first information processing apparatus is to be temporarily paused, a function temporary pause period for temporarily pausing at least some of functions of a second information processing apparatus and notifies the second information processing apparatus of the function temporary pause period, and the second information processing apparatus that temporarily pauses, based on the function temporary pause period notified from the first information processing apparatus, at least some of the functions of the second information processing apparatus and notifies the first information processing apparatus of an adjustment request for the function temporary pause period, and an information processing method for the communication system and a program for causing a computer to execute the method. This brings about action that, when at least some of functions of the first information processing apparatus is to be temporarily paused, the first information processing apparatus sets a function temporary pause period for temporarily pausing at least some of functions of the second information processing apparatus and notifies the second information processing apparatus of the function temporary pause period, and the second information processing apparatus temporarily pauses, based on the function temporary pause period notified from the first information processing apparatus, at least some of the functions of the second information processing apparatus and notifies the first information processing apparatus of an adjustment request for the function temporary pause period.

Advantageous Effect of Invention

With the present technology, a superior effect that the power consumption of the information processing apparatus can be reduced can be achieved. It is to be noted that the effect described here is not necessarily limitative, but any of effects described in the present disclosure may be exhibited.

BRIEF DESCRIPTION OF DRAWINGS

FIG. 7 is a flow chart depicting an example of a function temporary pause period setting process in the setting process of the function temporary pause state by the base station 100 in the first embodiment of the present technology.

FIG. 8 is a view depicting an example of information to be used in the function temporary pause period setting process by the base station 100 in the first embodiment of the present technology.

DESCRIPTION OF EMBODIMENTS

In the following, details of modes for carrying out the present technology (hereinafter referred to as embodiments) are described. The description is given in the following order.

1. First Embodiment (example in which a function temporary pause period is set to a base station and a slave unit)
2. Second Embodiment (example in which a function temporary pause period of a base station is set on the basis of function temporary pause period adjustment request information notified from a slave unit)
3. Third Embodiment (example in which a function temporary pause period of a base station is set on the basis of information (decision information) that can be acquired from data received from a slave unit)
4. Application Examples

1. First Embodiment (Example of Configuration of Communication System)

Figure 1:
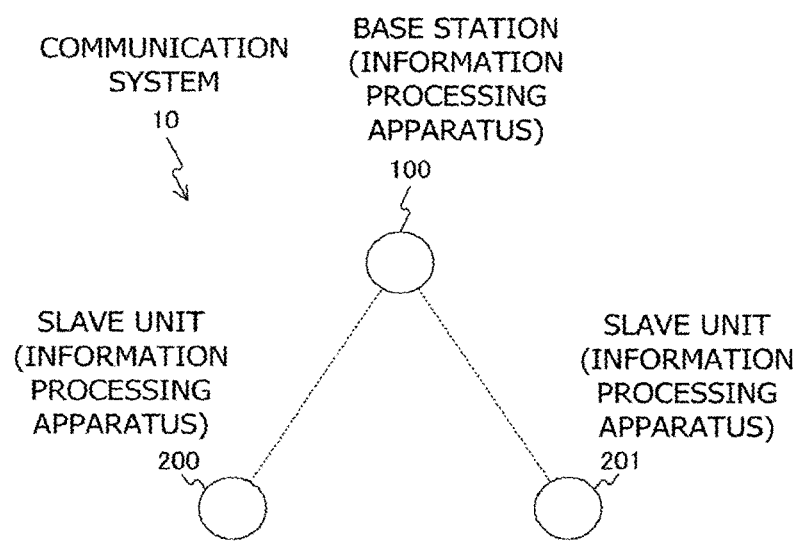
FIG. 1 is a view depicting an example of a configuration of a communication system 10 according to a first embodiment of the present technology.

FIG. 1 is a view depicting an example of a configuration of a communication system 10 in a first embodiment of the present technology.

In FIG. 1, an example of the communication system 10 is depicted in which a wireless network is configured from three apparatus (a base station (information processing apparatus) 100, a slave unit (information processing apparatus) 200 and another slave unit (information processing apparatus) 201). Further, in FIG. 1, an example is depicted in which, to one (for example, the base station (information processing apparatus) 100) of the three apparatus, the other two apparatus (for example, the slave unit (information processing apparatus) 200 and the slave unit (information processing apparatus) 201) establish connection.

For example, the base station 100 and the slave units 200 and 201 can be formed each as a fixed or portable information processing apparatus having a wireless communication function. Here, the fixed information processing apparatus is an information processing apparatus such as an access point (AP) or a base station in a wireless LAN system. Meanwhile, the portable information processing apparatus is an information processing apparatus such as a smartphone, a portable telephone set or a tablet terminal.

Further, it is assumed that the base station 100 and the slave units 200 and 201 each have a communication function in compliance with a wireless LAN standard such as IEEE802.11. For example, each of them can have a communication function in compliance with a wireless LAN standard of IEEE802.11ax. Further, as the wireless LAN, for example, Wi-Fi, Wi-Fi Direct, Wi-Fi CERTIFIED Miracast specifications (technical specification name: Wi-Fi Display) can be used. Further, wireless communication that employs a different communication method may be performed.

For example, the communication system 10 can be formed as a network in which a plurality of apparatus are connected to each other by performing wireless communication by 1:1 wireless communication (for example, a mesh network or an ad hoc network). For example, the communication system 10 can be applied to a mesh network of IEEE802.11s.

Further, the communication system 10 can be formed, for example, as a network configured from an access point (master unit) and its subordinate apparatus (slave unit or units). In the embodiment of the present technology, an example of a case is depicted in which the base station 100 serves as an access point and the slave units 200 and 201 serve as subordinate apparatus to the access point (base station 100).

Further, in FIG. 1, an example of a communication path where different apparatus communicate directly with each other utilizing wireless communication is indicated by a dotted line connecting the different apparatus to each other.

It is to be noted that, while, in the embodiment of the present technology, operation of an apparatus of the transmission source (transmission side apparatus) and operation of an apparatus of the transmission destination (reception side apparatus) are described individually for the convenience of description, each of the apparatus may have functions of both of them incorporated therein or may have only one of the functions.

Further, the system configuration that is a target of the embodiment of the present technology is not limited to them. For example, while FIG. 1 depicts an example of a communication system that is configured from three information processing apparatus, the number of information processing apparatus is not limited to this. Also the connection scheme of a plurality of information processing apparatus is not limited to the connection schemes described above. For example, also to a network in which a plurality of apparatus are connected by a connection scheme different from the connection schemes described hereinabove, the embodiment of the present technology can be applied. For example, only if a communication system allows a certain information processing apparatus to communicate with a plurality of information processing apparatus connected to the certain information processing apparatus, the number of information processing apparatus is not limited to this.

Further, the embodiment of the present technology supposes a wireless LAN system based on IEEE802.11. Further, the embodiment of the present technology indicates an example in which one (slave unit 200) from among slave units that have established connection to the base station 100 is an information processing apparatus having a specific function. Further, in the embodiment of the present technology, another one (slave unit 201) of the slave units having established connection to the base station 100 is an information processing apparatus that does not include the specific function. The information processing apparatus that does not include the specific function can be referred to as, for example, legacy apparatus.

It is to be noted that, in the embodiment of the present technology, an example of a communication system configured from a base station and slave units is indicated. However, the base station is not limited to a base station having a master-slave relationship as a master unit with respect to a slave unit like an AP of IEEE802.11, but the base station may be a transmission source of a direct link by a plurality of slave units.

Further, in the embodiment of the present technology, an example of a case is described in which, in a situation in which the slave unit (legacy apparatus) 201 that does not have the specific function is connected to the base station 100 in the communication system 10, the base station 100 enters a function temporary pause state.

Here, the specific function signifies a function for understanding a frame transmitted from the base station 100 to each slave unit (a frame for the notification of a function temporary pause period) when at least some of functions of the base station 100 is to be temporarily paused.

Further, the function temporary pause period signifies a period within which at least some of functions provided for an information processing apparatus (for example, the base station 100 or the slave unit 200) is to be temporarily paused.

Further, in the description of the embodiment of the present technology, a function for temporarily pausing some of functions of an own apparatus is referred to as function temporary pause function. This function temporary pause function is, for example, a function provided to each slave unit and signifies a function for understanding that a base station enters a function temporary pause state and carrying out that also the own apparatus enters a function temporary pause state within the function temporary pause period of the base station. Further, in the embodiment of the present technology, it is assumed that a slave unit that includes the function temporary pause function has the specific function while a slave unit that does not have the function temporary pause function does not have the specific function. In other words, the slave unit 200 that has the function temporary pause function has the specific function, and the slave unit 201 that does not have the function temporary pause function does not have the specific function.

Further, the function temporary pause function information is information for the notification that the function temporary pause function is provided. Further, in the figures, the function temporary pause function information is denoted by Function Suspension Capability (FSC).

Further, the function temporary pause period information is information relating to a function temporary pause period. For example, the function temporary pause period information is information including a point of time at which a base station is to transition to a function temporary pause state and a period within which the base station is to be in the function temporary pause state. Alternatively, for example, the function temporary pause period information is information including a point of time at which a slave unit is to transition to a function temporary pause state and a period within which the slave unit is to be in the function temporary pause state. Further, in the figures, the function temporary pause period information is denoted by Function Suspension Period (FSP).

In this manner, the function temporary pause state signifies a state in which at least some of functions of a base station is inactive. For example, the function temporary pause state can be a state in which the reception function the base state has is inactive (for example, a low power consumption state (for example, a Doze state)). However, it is supposed that, for example, even in a case in which the base station is in a low power consumption state in a relation to a slave unit connected thereto, the base station is performing some other operation. Further, it is supposed that, even in a case in which the base station is in a low power consumption state in a relation to a slave unit connected thereto, the base station is performing an operation of a group other than a group connected to the base station. Further, even in a case in which the base station is in a low power consumption state in a relation to a slave unit connected thereto, it is supposed that the base station is performing a search of a group other than a group connected to the base station. Therefore, even in a case in which the base station is in a low power consumption state in a relation to a slave unit connected thereto, a state in a case in which the base station is not in a low power consumption state in a relation to other apparatus than the slave unit connected thereto is included in the function temporary pause state. This similarly applies also to the function temporary pause state of each slave unit.

For example, a temporary pause of the base station 100 can be a temporary pause for allowing the base station 100 to enter a power saving state. Further, for example, the temporary pause of the base station 100 can be a temporary pause of any other function than the function for temporarily pausing the functions of the group to which the base station 100 belongs while allowing the functions of any other group than the group to be carried out. Further, the temporary pause of the base station 100 can be a temporary pause of any other function than the function for temporarily pausing the functions of the group to which the base station 100 belongs while allowing a new group, to which the base station 100 is to belong, to be searched. Further, the temporary pause of the base station 100 can be a combination of plural ones of the temporary pauses.

Further, the first embodiment of the present technology indicates an example in which the base station 100 uses a notification method that can be understood only by the slave unit 200 to cause the slave unit 200 to enter a function temporary pause state, whereafter the base station 100 enters a function temporary pause state. It is to be noted that, when the base station 100 enters a function temporary pause state, the slave unit 201 may be suppressed from transmission.

(Example of Functional Configuration of Base Station (Information Processing Apparatus))

Figure 2:
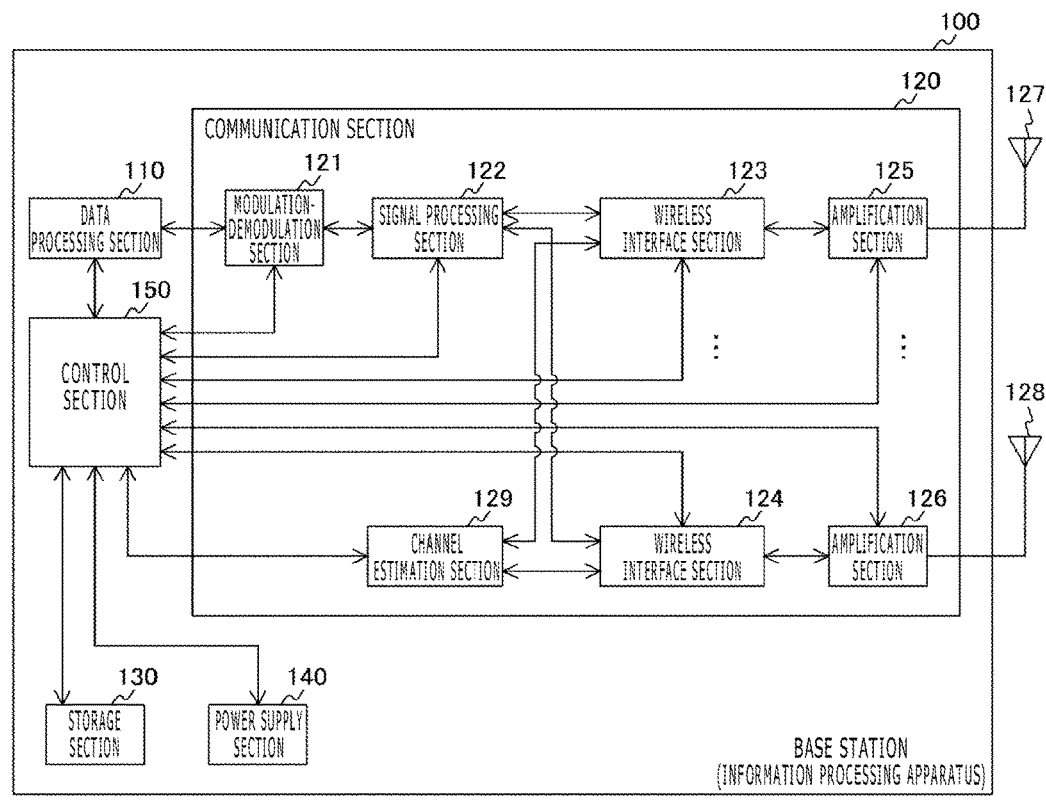
FIG. 2 is a block diagram depicting an example of a functional configuration of a base station 100 in the first embodiment of the present technology.

FIG. 2 is a block diagram depicting an example of a functional configuration of the base station 100 in the first embodiment of the present technology. It is to be noted that the slave unit 200 and the slave unit 201 have a functional configuration (configuration relating to wireless communication) substantially similar to the functional configuration of the base station 100. Therefore, description of the functional configuration of the slave unit 200 and the slave unit 201 is omitted.

The base station 100 includes a data processing section 110, a communication section 120, a storage section 130, a power supply section 140 and a control section 150. Further, the communication section 120 includes a modulation-demodulation section 121, a signal processing section 122, wireless interface sections 123 and 124, amplification sections 125 and 126, antennae 127 and 128 and a channel estimation section 129.

The data processing section 110 processes various kinds of data under the control of the control section 150. For example, upon transmission when data is inputted from an upper layer, the data processing section 110 generates a packet for wireless transmission from the data. Then, the data processing section 110 executes such processes as addition of a header and addition of an error detection code for media access control (MAC), and provides data after the processes to the modulation-demodulation section 121. On the other hand, for example, upon reception when an input from the modulation-demodulation section 121 is received, the data processing section 110 carries out analysis of a MAC header, detection of a packet error, a reorder process and so forth and provides data after the processes to a protocol upper layer of the own apparatus. Further, for example, the data processing section 110 notifies the control section 150 of an analysis result of a header, a detection result of a packet error and so forth.

The modulation-demodulation section 121 performs a modulation-demodulation process under the control of the control section 150. For example, upon transmission, the modulation-demodulation section 121 performs, encoding, interleaving and modulation for input data from the data processing section 110 on the basis of coding and modulation methods set by the control section 150. Then, the modulation-demodulation section 121 generates a data symbol stream and provides the data symbol stream to the signal processing section 122. On the other hand, for example, upon reception, the modulation-demodulation section 121 performs processes reverse to those upon transmission for an input form the signal processing section 122 and provides data to the data processing section 110 or the control section 150.

The signal processing section 122 performs various signal processes under the control of the control section 150. For example, upon transmission, the signal processing section 122 performs a signal process (spatial signal process) used for spatial separation for an input from the modulation-demodulation section 121 as occasion demands and provides one or more transmission symbol streams obtained by the process to the wireless interface sections 123 and 124. Further, for example, upon reception, the signal processing section 122 performs a signal process for a reception symbol stream inputted from the wireless interface section 123 or 124, performs spatial resolution of the stream as occasion demands, and supplies a result of the spatial resolution to the modulation-demodulation section 121.

Each of the wireless interface sections 123 and 124 is an interface for establishing connection to a different information processing apparatus utilizing wireless communication to transmit and receive various kinds of information. For example, upon transmission, each of the wireless interface sections 123 and 124 converts an input from the signal processing section 122 into an analog signal and carries out filtering and up conversion into a carrier frequency. Then, the each of the wireless interface sections 123 and 124 sends out the analog signal to the antenna 127 or 128 through the amplification section 125 or 126. On the other hand, for example, upon reception, each of the wireless interface sections 123 and 124 carries out reverse processes to an input from any of the antennae 127 and 128 and the amplification sections 125 and 126 and provides resulting data to the signal processing section 122 and the channel estimation section 129.

The amplification sections 125 and 126 are amplifiers for amplifying an analog signal to predetermined power. For example, upon transmission, each of the amplification sections 125 and 126 amplifies an analog signal inputted from the wireless interface section 123 or 124 to predetermined power such that the analog signal is sent out from the antenna 127 or 128. On the other hand, for example, upon reception, each of the amplification sections 125 and 126 amplifies a signal inputted from the antenna 127 or 128 to predetermined power and outputs the amplified signal to the wireless interface section 123 or 124.

It is to be noted that the amplification sections 125 and 126 and the wireless interface sections 123 and 124 are depicted in different configurations from each other in FIG. 2. However, the amplification sections 125 and 126 may be configured such that at least one of a function upon transmission and a function upon reception is included in the wireless interface sections 123 and 124.

Further, in FIG. 2, an example of a case is depicted in which a plurality of combinations exist each of which includes the wireless interface section 123, amplification section 125 and antenna 127 that form one set and the wireless interface section 124, amplification section 126 and antenna 128 that form one set. However, as regards the wireless interface section, amplification section and antenna section, only one set may be provided as a component.

The channel estimation section 129 calculates complex channel gain information of a transmission path from a preamble part and a training signal part from within an input signal from each of the wireless interface sections 123 and 124. Then, the calculated complex channel gain information is utilized in a demodulation process by the modulation-demodulation section 121 and a spatial process by the signal processing section 122 through the control section 150.

The storage section 130 has a role as a working area for a data process by the control section 150 and a function as a storage medium for retaining various kinds of data. As the storage section 130, a storage medium such as a nonvolatile memory, a magnetic disk, an optical disk, or a magneto optical (MO) disk can be used. It is to be noted that, as a nonvolatile memory, for example, an electrically erasable programmable read-only memory (EEPROM) or an erasable programmable ROM (EPROM) can be used. Further, as a magnetic disk, for example, a hard disk or a disk type magnetic disk can be used. Further, as an optical disk, for example, a compact disc (CD), a digital versatile disc recordable (DVD-R) or a Blu-Ray (registered trademark) disc (BD) can be used.

The power supply section 140 supplies electric power to the components of the base station 100 under the control of the control section 150. For example, where the base station 100 is a fixed type apparatus, the power supply section 140 is configured from a fixed power supply. On the other hand, for example, where the base station 100 is a portable type apparatus (for example, a mobile apparatus), the power supply section 140 is configured from a battery power supply.

The control section 150 controls reception operation and transmission operation of the components of the base station 100 on the basis of a control program. For example, the control section 150 performs passing of information between the components of the base station 100. Further, for example, the control section 150 performs parameter setting for the modulation-demodulation section 121 and the signal processing section 122 and scheduling of packets for the data processing section 110. Further, for example, the control section 150 performs parameter setting and transmission power control for the wireless interface sections 123 and 124 and the amplification sections 125 and 126.

Further, the control section 150 performs processes for determining a transition timing to and a period of a function temporary pause state of the own apparatus in the base station 100. In this case, the data processing section 110 incorporates the information into data.

Meanwhile, a control section (corresponding to the control section 150) of the slave unit 200 performs a process for determining a notification regarding a function temporary pause state corresponding to the own apparatus and performs a process for determining a response to transition information to a function temporary pause state of the base station 100. In this case, a data processing section (corresponding to the data processing section 110) of the slave unit 200 incorporates the information into data.

For example, when the control section 150 is to temporarily pause at least some of the functions of the base station 100 (for example, functions as a base station), it performs control for setting a function temporary pause period within which at least some of functions of the slave unit 200 is to be paused. In this case, the control section 150 performs control for acquiring information regarding the slave unit 200 and setting a function temporary pause period on the basis of the information. The information regarding the slave unit 200 is, for example, at least one of presence or absence of a function for setting a function temporary pause period in the slave unit 200 and the number of slave units connected to the base station 100. Further, the control section 150 performs control for notifying the slave unit 200 of the set function temporary pause period. In this case, the control section 150 performs control for transmitting, to the slave unit 200 that has the specific function capable of understanding a frame (depicted in FIG. 4) for the notification of the function temporary pause period, the frame to notify the slave unit 200 of the set function temporary pause period.

Further, for example, when the control section 150 has not acquired information regarding presence or absence of the specific function from a slave unit connected to the base station 100, then it performs control for requesting for the information regarding presence or absence of the specific function. For example, where a plurality of slave units are connected to the base station 100, the control section 150 performs notification of a function temporary pause period and request for information regarding presence or absence of the specific function by one of a first method for performing them for each of the slave units and a second method for performing them collectively for the plurality of slave units.

Further, for example, the control section of the slave unit 200 (corresponding to the control section 150) performs control for setting a period for which at least some of the functions provided for the slave unit 200 is to be temporarily paused on the basis of a function temporary pause period notified from the base station 100.

(Example of Configuration of Frame for Notification of Function Temporary Pause Function)

Figure 3:
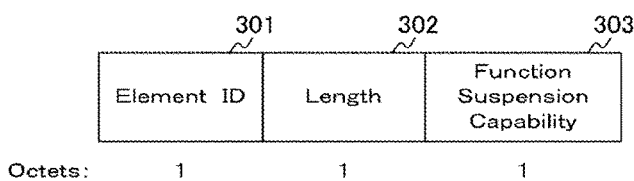
FIG. 3 is a view depicting an example of a configuration of a frame exchanged between the base station 100 and a slave unit 200 in the first embodiment of the present technology.

FIG. 3 is a view depicting an example of a configuration of a frame exchanged between the base station 100 and the slave unit 200 in the first embodiment of the present technology. In particular, an example of a configuration of a frame that is used when the base station 100 issues a request for function temporary pause function information to the slave unit 200 and an example of a configuration of a frame that is used when the slave unit 200 issues a notification of a function temporary pause function to the base station 100. Further, in FIG. 3, an example is depicted in which an information element (IE) for the request for function temporary pause function information and the notification that a function temporary pause function is provided is used.

The IE includes an ELEMENT ID 301, a Length 302 and a Function Suspension Capability 303. It is to be noted that, in FIG. 3, a numerical value representative of Octets of each field is indicated at the lower side of each field.

In the ELEMENT ID 301, an ID indicating that the IE is an IE for request for function temporary pause function information or that the IE is an IE for the notification that a function temporary pause function is provided is stored.

In the Length 302, information indicative of a length of data of the IE is stored.

The Function Suspension Capability 303 is a field for storing information for requesting function temporary pause function information or the function temporary pause function information. Thus, in the Function Suspension Capability 303, information for requesting function temporary pause function information or the function temporary pause function information is stored. Alternatively, in the Function Suspension Capability 303, both the information for requesting function temporary pause function information and the function temporary pause function information may be stored.

The base station 100 can place and transmit to the slave unit 200, for example, the IE depicted in FIG. 3 into and together with one of the frames (A1) to (A7) given below. In other words, the base station 100 can request the slave unit 200 for function temporary pause function information using one of the following frames (A1) to (A7):

(A1) Beacon frame defined by IEEE Std 802.11(TM)-2012

(A2) Association Response frame defined by IEEE Std 802.11 (TM)-2012

(A3) Reassociation Response frame defined by IEEE Std 802.11 (TM)-2012

(A4) Probe Response frame defined by IEEE Std 802.11 (TM)-2012

(A5) Action frame defined by IEEE Std 802.11(TM)-2012

(A6) Action No Ack frame defined by IEEE Std 802.11 (TM)-2012

(A7) New frame not defined by IEEE Std 802.11(TM)-2012

The slave unit 200 can place and transmit to the base station 100, for example, the IE depicted in FIG. 3 into and together with one of the frames (B1) to (B6) given below. In other words, the slave unit 200 can notify the base station 100 of function temporary pause function information using one of the following frames (B1) to (B6):

(B1) Association Request frame defined by IEEE Std 802.11 (TM)-2012

(B2) Reassociation Request frame defined by IEEE Std 802.11 (TM)-2012

(B3) Probe Request frame defined by IEEE Std 802.11 (TM)-2012

(B4) Action frame defined by IEEE Std 802.11(TM)-2012

(B5) Action No Ack frame defined by IEEE Std 802.11 (TM)-2012

(B6) New frame not defined by IEEE Std 802.11(TM)-2012

(Example of Configuration of Frame for Notification of Function Temporary Pause Period)

Figure 4:
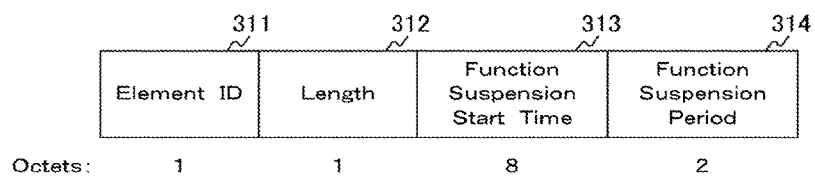
FIG. 4 is a view depicting an example of a configuration of a frame that is used when a notification of a function temporary pause period is issued from the base station 100 to the slave unit 200 in the first embodiment of the present technology.

FIG. 4 is a view depicting an example of a configuration of a frame that is used when the base station 100 notifies the slave unit 200 of a function temporary pause period in the first embodiment of the present technology. In FIG. 4, an example in which an IE for notifying of a function temporary pause period is used is depicted.

The IE includes an ELEMENT ID 311, a Length 312, a Function Suspension Start Time 313 and a Function Suspension Period 314. It is to be noted that, in FIG. 4, a numerical value representative of Octets of each field is indicated at the lower side of each field.

In the ELEMENT ID 311, an ID indicating that the IE is an IE for the notification of a function temporary pause period is stored.

In the Length 312, information indicative of a length of data of the IE is stored.

In the Function Suspension Start Time 313, information regarding a starting point of time of the function temporary pause period is stored.

In the Function Suspension Period 314, information regarding a function temporary pause period is stored.

The base station 100 can place and transmit to the slave unit 200, for example, the IE depicted in FIG. 4 into and together with one of the frames (C1) to (C7) given below. In other words, the base station 100 can notify the slave unit 200 of a function temporary pause period using one of the following frames (C1) to (C7):

(C1) Beacon frame defined by IEEE Std 802.11(TM)-2012

(C2) Association Response frame defined by IEEE Std 802.11 (TM)-2012

(C3) Reassociation Response frame defined by IEEE Std 802.11 (TM)-2012

(C4) Probe Response frame defined by IEEE Std 802.11 (TM)-2012

(C5) Action frame defined by IEEE Std 802.11(TM)-2012

(C6) Action No Ack frame defined by IEEE Std 802.11 (TM)-2012

(C7) New frame not defined by IEEE Std 802.11(TM)-2012

For example, the base station 100 confirms in advance whether or not the slave unit 200 and the slave unit 201 each have the function temporary pause function. For example, the base station 100 transmits the IE depicted in FIG. 3 (IE of the request for function temporary pause function information) to the slave unit 200 and the slave unit 201. Then, for example, the base station 100 has the IE depicted in FIG. 3 (IE for notifying that the function temporary pause function is provided) transmitted from the slave unit 200. Consequently, the base station 100 can confirm in advance that the slave unit 200 has the function temporary pause function. On the other hand, for example, since the base station 100 does not receive the IE depicted in FIG. 3 (IE for notifying that the function temporary pause function is provided) transmitted from the slave unit 201, it can confirm in advance that the slave unit 201 does not have the function temporary pause function.

Here, exchange of the IE depicted in FIG. 3 can be performed at timings at which exchange of some information is performed between the base station 100 and the slave unit 200. For example, when the Capability is exchanged by Handshake, exchange of the IE depicted in FIG. 3 can be performed.

In this manner, the base station 100 uses the IE depicted in FIG. 3 to confirm whether or not the slave unit 200 and the slave unit 201 each have the function temporary pause function, and manages results of the confirmation. For example, the base station 100 can store the confirmation results into the storage section 130 and manage them. Further, as described hereinabove, a slave unit that has the function temporary pause function has the specific function, and a slave unit that does not have the function temporary pause function does not have the specific function.

(Example of Setting of Function Temporary Pause State)

Figure 5:
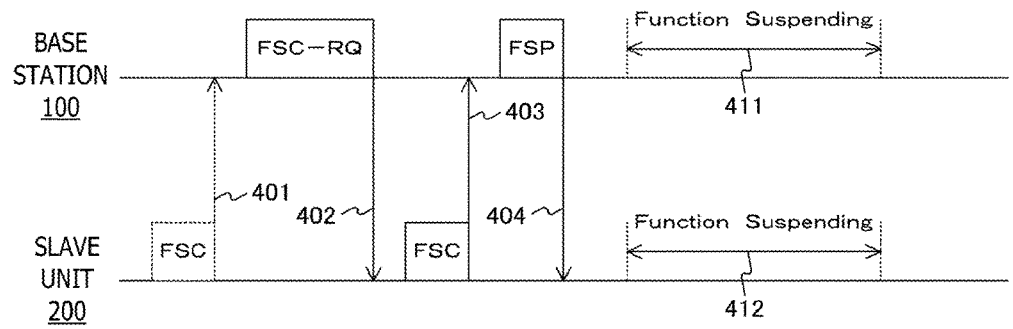
FIG. 5 is a view schematically depicting data exchanged between different apparatus and a period of a function temporary pause state in each of the different apparatus in the first embodiment of the present technology.

FIG. 5 is a view schematically depicting data exchanged between apparatus and a period of a function temporary pause state of each apparatus in the first embodiment of the present technology. The axis of abscissa depicted in FIG. 5 indicates a time axis. Further, data transmitted from the individual apparatus are schematically indicated by rectangles on the time axis. This similarly applies also to FIGS. 11 and 14.

FIG. 5 depicts an example of a case in which the slave unit 200 that retains data to be transmitted to the base station 100 is connected to the base station 100. Further, FIG. 5 depicts an example of a case in which a function temporary pause period set to the slave unit 200 by the base station 100 is same as a function temporary pause period of the base station 100.

First, a notification of function temporary pause function information is issued from the slave unit 200 to the base station 100 (401). For example, the slave unit 200 can notify the base station 100 by transmitting a frame including function temporary pause function information to the base station 100. Alternatively, for example, upon confirmation of Capability upon Association in advance, the slave unit 200 may issue a notification of function temporary pause function information to the base station 100.

Where a notification of function temporary pause function information is issued from the slave unit 200 to the base station 100 and the base station 100 retains the function temporary pause function information of the slave unit 200 in this manner, the request for function temporary pause function information (402) can be omitted.

On the other hand, where the base station 100 does not retain the function temporary pause function information of the slave unit 200, it issues a request for function temporary pause function information to the slave unit 200 (402). The slave unit 200 receiving this request from the base station 100 notifies the base station 100 of the function temporary pause function information (403).

The base station 100 sets a period for which the own apparatus is to temporarily pause its function on the basis of the function temporary pause function information notified from the slave unit 200. Then, the base station 100 notifies the slave unit 200 of the set function temporary pause period (404).

The base station 100 enters a function temporary pause state at the point of time, at which the base station 100 is to enter a function temporary pause state, whose notification has been issued to the slave unit 200, and maintains the function temporary pause state for the function temporary pause period (411).

Further, the slave unit 200 enters a function temporary pause state on the basis of the point of time which has been notified from the base station 100 and at which the slave unit 200 is to enter a function temporary pause state, and maintains the function temporary pause state for the function temporary pause period (412).

In FIG. 5, an example of a case in which one slave unit 200 is connected to the base station 100 is indicated. Where a plurality of slave units are connected to the base station 100, request for function temporary pause function information and notification of a function temporary pause period may be performed individually for each slave unit or may be performed collectively for all slave units.

(Example of Operation of Base Station)

Figure 6:
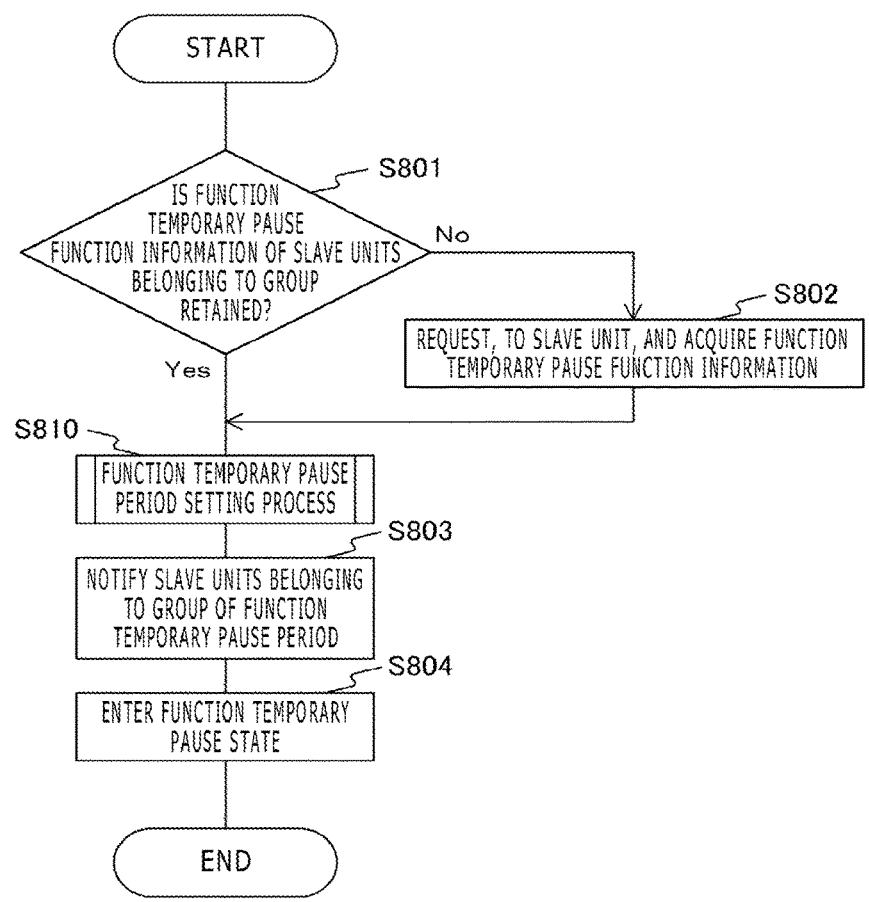
FIG. 6 is a flow chart depicting an example of a processing procedure of a setting process of a function temporary pause state by the base station 100 in the first embodiment of the present technology.

FIG. 6 is a flow chart depicting an example of a processing procedure of a setting process of a function temporary pause state by the base station 100 in the first embodiment of the present technology.

First, the control section 150 decides whether or not it retains function temporary pause function information of the slave units belonging to the group of the base station 100 (step S801). If the control section 150 does not retain function temporary pause function information of the slave units belonging to the group of the base station 100 (step S801), then the control section 150 issues a request for function temporary pause function information to the slave units (step S802). Then, the control section 150 acquires function temporary pause function information transmitted thereto from the slave units in response to the request (step S802).

It is to be noted that, where a plurality of slave units belong to the group of the base station 100, the control section 150 decides for each slave unit whether or not it retains function temporary pause function information (step S801), and then issues a request for function temporary pause function information to each slave unit with regard to which the control section 150 does not retain function temporary pause function information (step S802).

If the control section 150 retains function temporary pause function information of the slave units belonging to the group of the base station 100 (step S801) or acquires the function temporary pause function information (step S802), then it performs a function temporary pause period setting process (step S810). The function temporary pause period setting process is hereinafter descried in detail with reference to FIG. 7.

Then, the control section 150 notifies each of the slave units belonging to the group of the base station 100 of the function temporary pause period set in the function temporary pause period setting process (step S803). For example, the control section 150 transmits the frame depicted in FIG. 4 to the base station 100 to notify the base station 100 of the function temporary pause period.

Then, the control section 150 enters a function temporary pause state on the basis of the function temporary pause period set in the function temporary pause period setting process (step S804).

(Example of Function Temporary Pause Period Setting Process)

FIG. 7 is a flow chart depicting an example of the function temporary pause period setting process (step S810 depicted in FIG. 6) in the setting process of a function temporary pause state by the base station 100 in the first embodiment of the present technology.

First, the control section 150 sets a function temporary pause period of the own apparatus (base station 100) on the basis of the function temporary pause function information acquired from the slave units belonging to the group of the base station 100 (step S811).

For example, when the number of slave units that do not have the function temporary pause function is great, if the function temporary pause period of the base station 100 is set short, then, loss of the data from the slave units can be reduced. Therefore, where a plurality of slave units are connected to the base station 100, for example, the function temporary pause period can be set on the basis of whether or not the number of slave units that do not have the function temporary pause function (the ratio of such slave units to all slave units) is great with reference to a threshold value (first threshold value) determined in advance. For example, if the number of slave units that do not have the function temporary pause function is equal to or greater than the first threshold value, then the function temporary pause period is set shorter than a reference value. On the other hand, for example, when the number of slave units that do not have the function temporary pause function is smaller than the first threshold value, the function temporary pause period is set longer than the reference value.

Further, the control section 150 can set a function temporary pause period of the base station 100 taking the power supply state of the base station 100 into consideration. For example, where the power supply of the base station 100 is a battery and the remaining battery capacity is low with reference to a threshold value (second threshold value), the function temporary pause period of the base station 100 can be set long.

Then, the control section 150 sets a function temporary pause period for the slave units belonging to the group of the base station 100 (step S812). For example, the function temporary pause period of the base station 100 and the function temporary pause period of the slave unit 200 can be made equal to each other.

(Example in which Function Temporary Pause Period is Set Based on Number of Slave Units Connected to Base Station)

Here, an example in which a function temporary pause period is set on the basis of the number of slave units connected to the base station 100 is described.

FIG. 8 is a view depicting an example of information to be used in the function temporary pause period setting process by the base station 100 in the first embodiment of the present technology.

FIG. 8 depicts a correspondence relation between the number X of slave units connected to the base station 100 and the function temporary pause period P to be set. It is assumed that the correspondence relation between the number X of slave units connected to the base station 100 and the function temporary pause period P to be set is determined in advance in this manner.

Figure 9:
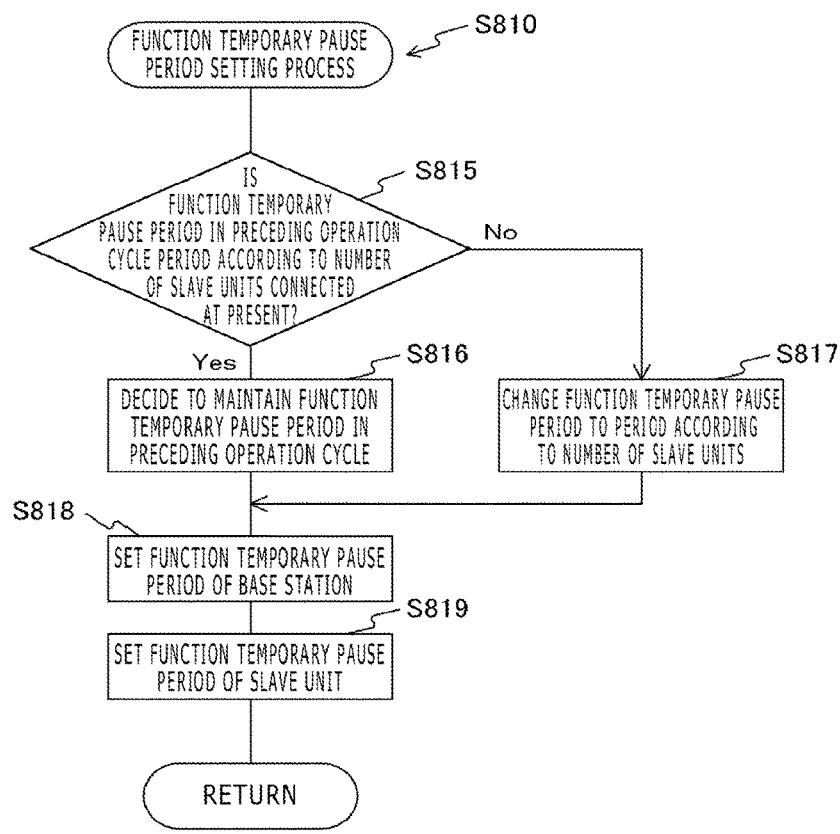
FIG. 9 is a flow chart depicting an example of the function temporary pause period setting process in the setting process of the function temporary pause state by the base station 100 in the first embodiment of the present technology.

FIG. 9 is a flow chart depicting an example of the function temporary pause period setting process (step S810 depicted in FIG. 6) in the setting process of a function temporary pause state by the base station 100 in the first embodiment of the present technology. This function temporary pause period setting process is a modification to that of FIG. 7 and depicts an example in which a function temporary pause period is set on the basis of the number of slave units connected to the base station 100.

First, the control section 150 decides whether or not the function temporary pause period set in the preceding operation cycle is a period according to the number of connected slave units determined in advance (step S815). For example, the control section 150 decides whether or not the relation between the number X of slave units connected to the base station 100 and the function temporary pause period P set in the preceding operation cycle coincides with the information depicted in FIG. 8.

If the function temporary pause period set in the preceding operation cycle is a period according to the number of connected slave units determined in advance (step S815), then the control section 150 decides that the function temporary pause period in the preceding operation cycle is to be maintained in the next operation cycle (step S816).

If the function temporary pause period set in the preceding operation cycle is not a period according to the number of connected slave units determined in advance (step S815), then the control section 150 decides that the function temporary pause period for the next operation cycle is changed to a period according to the number of connected slave units (step S817).

Then, the control section 150 sets, on the basis of a result of the decision, a function temporary pause period for the own apparatus (base station 100) (step S818).

For example, a case is supposed in which the number X of slave units connected at present to the base station 100 is within a range of N2≤X<N3 and the function temporary pause period P set in the preceding operation cycle is within a range of P2 min≤P≤P2max. In this case, the relation between the number X and the period P does not coincide with the information depicted in FIG. 8 (step S815). Therefore, the control section 150 decides to change the function temporary pause period for the next operation cycle to a period according to the number of connected slave units (step S817). Then, the control section 150 sets, on the basis of the information depicted in FIG. 8, the function temporary pause period for the next operation cycle so as to be included in a range of a period according to the number X of connected slave units (P3 min≤P≤P3max) (step S818).

Further, another case is supposed in which, for example, the number X of slave units connected at present to the base station 100 is within a range of 1≤X≤N1 and the function temporary pause period P set in the preceding operation cycle is within a range of P1min≤P≤P1max. In this case, the relation between the number X and the period P coincides with the information depicted in FIG. (step S815). Therefore, the control section 150 decides to maintain the function temporary pause period in the preceding operation cycle in the next operation cycle (step S816). In this case, the control section 150 sets the function temporary pause period in the preceding operation cycle (P1min≤P≤P1max) (step S818).

Thereafter, the control section 150 sets a function temporary pause period for the slave units belonging to the group of the base station 100 (step S819). For example, the function temporary pause period for the base station 100 and the function temporary pause period for the slave unit 200 can be set equal to each other.

(Example of Operation of Slave Unit)

Figure 10:
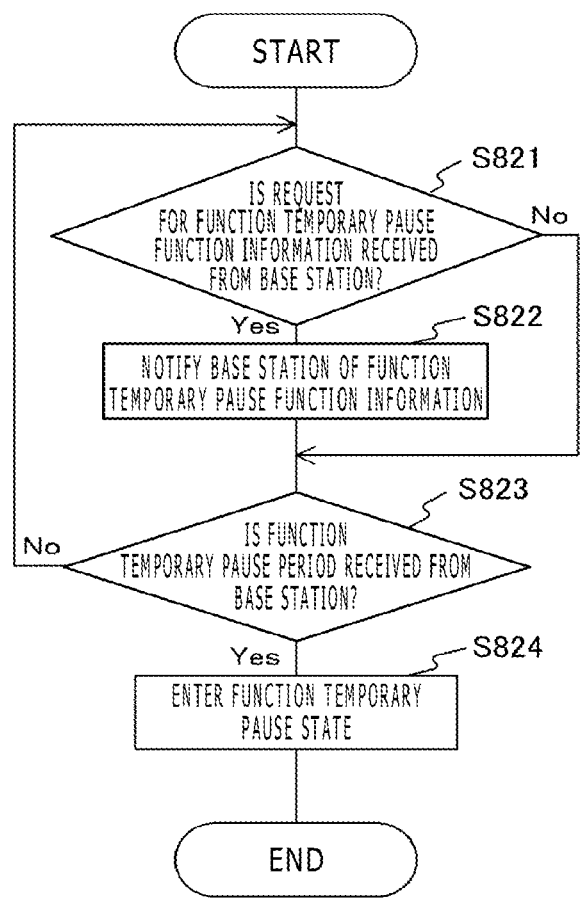
FIG. 10 is a flow chart depicting an example of a processing procedure of a setting process of a function temporary pause state by the slave unit 200 in the first embodiment of the present technology.

FIG. 10 is a flow chart depicting an example of a processing procedure of a setting process of a function temporary pause state by the slave unit 200 in the first embodiment of the present technology.

First, the control section of the slave unit 200 (control section 150 depicted in FIG. 2) decides whether or not a request for function temporary pause function information is received from the base station 100 (step S821). If a request for function temporary pause function information is not received (step S821), then the processing advances to step S823.

If a request for function temporary pause function information is received (step S821), then the control section 150 notifies the base station 100 of the function temporary pause function information (step S822). For example, the control section 150 notifies the base station 100 of the function temporary pause function information by transmitting the frame depicted in FIG. 3 to the base station 100.

Then, the control section of the slave unit 200 decides whether or not a function temporary pause period is received from the base station 100 (step S823). If a function temporary pause period is not received (step S823), then the processing returns to step S821.

If a function temporary pause period is received (step S823), then the control section of the slave unit 200 enters a function temporary pause state on the basis of the function temporary pause period notified from the base station 100 (step S824).

In this manner, according to the first embodiment of the present technology, the base station 100 can recognize that there is a slave unit 201 that cannot understand that the own apparatus enters a function temporary pause state. Further, power saving, carrying out of a function for a different group, search for a different group and enhancement in opportunity of them in an apparatus having a function as a base station (base station 100) and maintenance of a packet loss rate of a slave unit can be simultaneously satisfied.

2. Second Embodiment

A second embodiment of the present technology indicates an example in which a function temporary pause period for a base station is set on the basis of function temporary pause period adjustment request information notified from a slave unit.

It is to be noted that the configuration of each apparatus in the second embodiment of the present technology is substantially same as that of the base station 100 and the slave units 200 and 201 depicted in FIG. 1, FIG. 2 and so forth. Further, definitions of a function temporary pause function, function temporary pause function information and function temporary pause period information are similar to those in the first embodiment of the present technology. Therefore, elements same as those of the first embodiment of the present technology are denoted by the same reference signs, and part of description of them is omitted herein.

Further, also for frames to be exchanged between the base station 100 and the slave unit 200, similar frames to those in the first embodiment of the present technology can be used. For example, for a frame that is used when the base station 100 issues a request for function temporary pause function information and a frame that is used when the slave unit 200 issues a notification for function temporary pause function information, frames similar to those used in the first embodiment of the present technology can be used. Further, for a frame that is used when the base station 100 notifies the slave unit 200 of a function temporary pause period, for example, a frame similar to that used in the first embodiment of the present technology can be used. Also for the IE included in those frames, for example, an IE similar to that used in the first embodiment of the present technology can be used.

(Example of Setting of Function Temporary Pause State)

Figure 11:
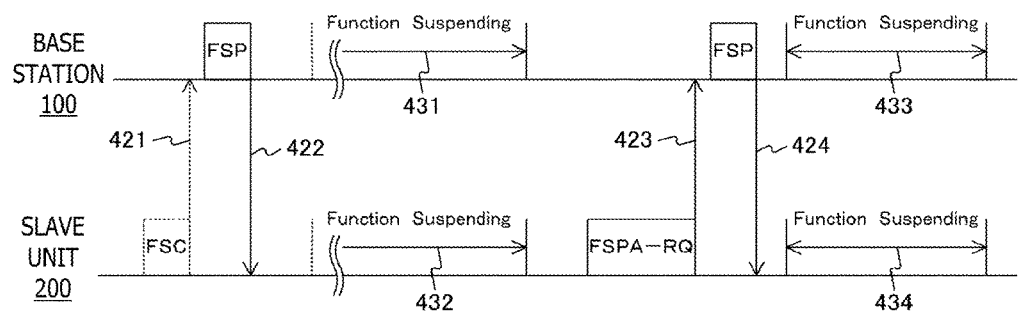
FIG. 11 is a view schematically depicting data exchanged between different apparatus and a period of a function temporary pause state in each of the different apparatus in a second embodiment of the present technology.

FIG. 11 is a view schematically depicting data exchanged between different apparatus and a period of a function temporary pause state in each apparatus in the second embodiment of the present technology.

FIG. 11 depicts an example of a case in which a slave unit 200 that retains data to be transmitted to the base station 100 is connected to the base station 100. Further, FIG. 11 depicts an example of a case in which the function temporary pause period set to the slave unit 200 by the base station 100 is same as the function temporary pause period of the base station 100.

In FIG. 11, it is assumed that a notification of function temporary pause function information is issued from the slave unit 200 to the base station 100, and the base station 100 receives the function temporary pause function information from the slave unit 200 in advance (421).

Further, it is assumed that, on the basis of the function temporary pause period set in advance by a suitable method, the base station 100 and the slave unit 200 have entered a function temporary pause state (431 and 432). In particular, the base station 100 notifies the slave unit 200 of the set function temporary pause period (422). Then, the base station 100 and the slave unit 200 enter a function temporary pause state and maintain a function temporary pause state during the function temporary pause period (431 and 432).

Further, the base station 100 and the slave unit 200 cancel the function temporary pause state at a point of time at which the function temporary pause state is to be canceled on the basis of the function temporary pause period information notified from the base station 100 (431 and 432).

Then, the slave unit 200 notifies the base station 100 of function temporary pause period adjustment request information (423). In this case, the slave unit 200 may notify the base station 100 of function temporary pause period adjustment request information in response to a trigger from the base station 100 or may spontaneously notify the base station 100 of the function temporary pause period adjustment request information. In FIG. 11, the function temporary pause period adjustment request information is denoted by Function Suspension Period Adjustment Request (FSPA-RQ).

Here, the function temporary pause period adjustment request information is information for requesting one of reduction, extension and maintenance of a function temporary pause period set by the base station 100.

Meanwhile, the slave unit 200 can place and transmit to the base station 100, for example, function temporary pause period adjustment request information into and together with one of the frames (D1) to (D6) given below. In other words, the slave unit 200 can notify the base station 100 of function temporary pause period adjustment request information using one of the following frames (D1) to (D6):

(D1) Association Request frame defined by IEEE Std 802.11 (TM)-2012
(D2) Reassociation Request frame defined by IEEE Std 802.11 (TM)-2012
(D3) Probe Request frame defined by IEEE Std 802.11 (TM)-2012
(D4) Action frame defined by IEEE Std 802.11(TM)-2012
(D5) Action No Ack frame defined by IEEE Std 802.11 (TM)-2012
(D6) New frame not defined by IEEE Std 802.11(TM)-2012

Then, the base station 100 sets a period for which the own apparatus is to temporarily pause its function on the basis of the function temporary pause period adjustment request information notified from the slave unit 200. Then, the base station 100 notifies the slave unit 200 of the set function temporary pause period (424).

The base station 100 enters a function temporary pause state at a point of time which has been notified to the slave unit 200 and at which the base station 100 is to enter a function temporary pause state and maintains the function temporary pause state for the function temporary pause period (433).

Meanwhile, the slave unit 200 enters a function temporary pause state on the basis of the point of time which has been notified from the base station 100 and at which the slave unit 200 is to enter a function temporary pause state and then maintains the function temporary pause state for the function temporary pause period (434).

FIG. 11 depicts an example of a case in which one slave unit 200 is connected to the base station 100. Where a plurality of slave units are connected to the base station 100, request for function temporary pause function information and notification of a function temporary pause period may be performed individually for each slave unit or may be performed collectively for all slave units.

Further, if function temporary pause period adjustment request information is not transmitted from the slave unit 200, then the base station 100 may issue a request for function temporary pause period adjustment request information to the slave unit 200. In this case, the base station 100 can place and transmit to the slave unit 200, for example, a request for function temporary pause period adjustment request information into and together with one of the frames (E1) to (E7) given below. In other words, the base station 100 can notify the slave unit 200 of function temporary pause period adjustment request information using one of the following frames (E1) to (E7):

(E1) Beacon frame defined by IEEE Std 802.11(TM)-2012
(E2) Association Response frame defined by IEEE Std 802.11 (TM)-2012
(E3) Reassociation Response frame defined by IEEE Std 802.11 (TM)-2012
(E4) Probe Response frame defined by IEEE Std 802.11 (TM)-2012
(E5) Action frame defined by IEEE Std 802.11(TM)-2012
(E6) Action No Ack frame defined by IEEE Std 802.11 (TM)-2012
(E7) New frame not defined by IEEE Std 802.11(TM)-2012

Figure 12:
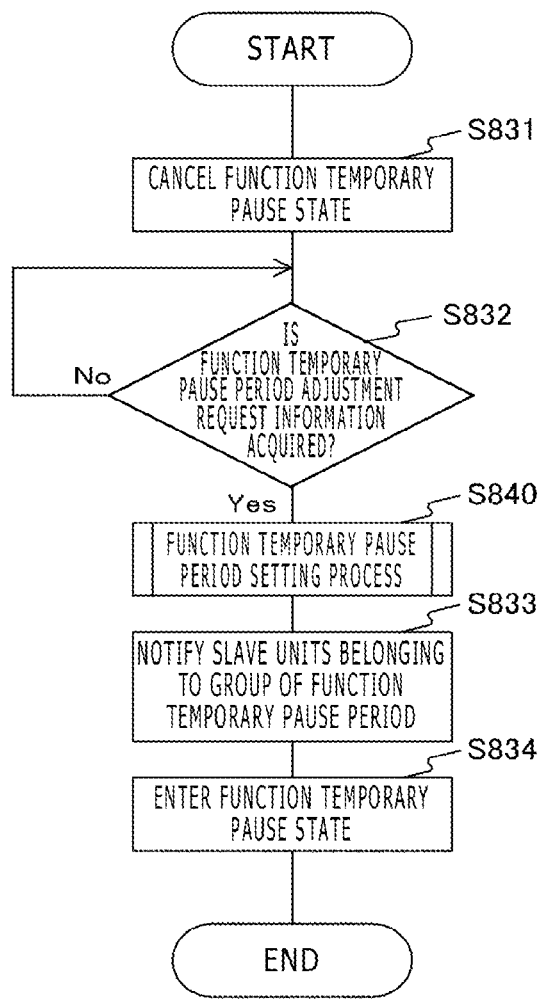
FIG. 12 is a flow chart depicting an example of a processing procedure of a setting process of a function temporary pause state by a base station 100 in the second embodiment of the present technology.

(Example of Operation of Base Station)
FIG. 12 is a flow chart depicting an example of a processing procedure of a setting process of a function temporary pause state by the base station 100 in the second embodiment of the present technology. In FIG. 12, an example of a case is depicted in which the base station 100 is in a function temporary pause state on the basis of a function temporary pause period set in advance similarly as in the example depicted in FIG. 11.

First, the control section 150 cancels the function temporary pause state of the base station 100 (step S831). Then, the control section 150 acquires function temporary pause period adjustment request information transmitted from a slave unit (step S832).

Then the control section 150 performs a function temporary pause period setting process for setting a function temporary pause period in the next operation cycle on the basis of the function temporary pause period adjustment request information (step S840). The function temporary pause period setting process is similar to that in the example of operation depicted in FIG. 7. However, information used when a function temporary pause period is set is different. Therefore, description here is given principally of differences from the example of operation depicted in FIG. 7 with reference to FIG. 7.

For example, where a plurality of slave units are connected to the base station 100, the control section 150 can set a function temporary pause period on the basis of the function temporary pause period adjustment request information transmitted from the plurality of slave units connected to the base station 100.

For example, the control section 150 can set a function temporary pause period on the basis of whether or not the number of slave units from which a notification of a reduction request is received (or the ratio of such slave units to all slave units) is great with reference to a threshold value determined in advance. Alternatively, the control section 150 can set a function temporary pause period on the basis of whether or not the ratio of the number of slave units from which a notification of a reduction request is received to the number of slave units from which a notification of a different request is received is high with reference to a threshold value determined in advance.

For example, where the number of slave units from which a notification of a reduction request is received (or the ratio of such slave units to all slave units) is equal to or higher than a third threshold value, the function temporary pause period can be set short.

By accepting a reduction request preferentially in this manner, the communication characteristic of slave units whose communication characteristic is degraded can be improved, and the fairness can be maintained.

Alternatively, the function temporary pause period of the own apparatus may be set taking the power supply state of the own apparatus into consideration. For example, where the power supply of the base station 100 is a battery and the remaining battery capacity is low with reference to a threshold value, the function temporary pause period can be set long.

Then, the control section 150 notifies the slave units belonging to the group of the base station 100 of the function temporary pause period set by the function temporary pause period setting process (step S833). Then, the control section 150 enters a function temporary pause state on the basis of the function temporary pause period set by the function temporary pause period setting process (step S834)

Figure 13:
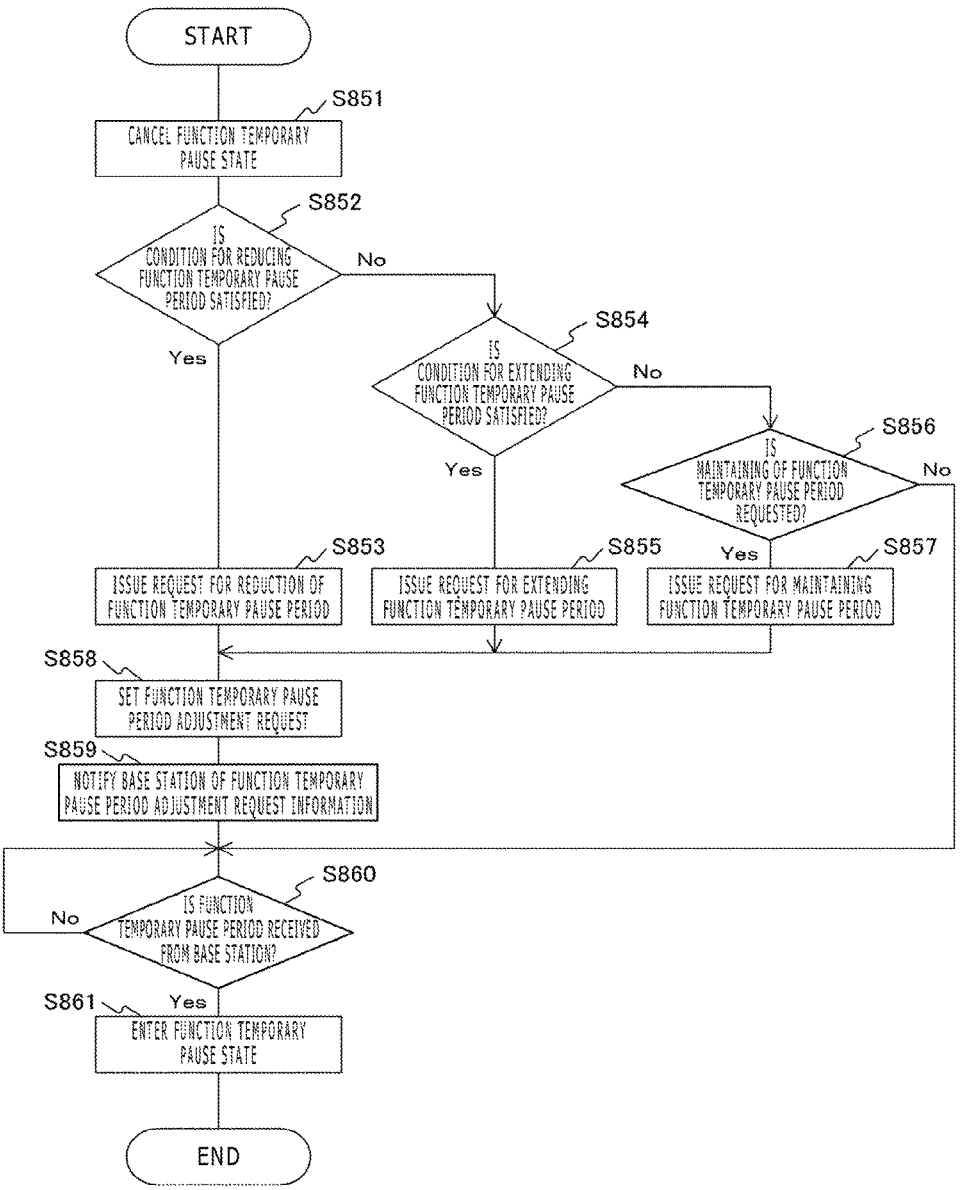
FIG. 13 is a flow chart depicting an example of a processing procedure of a setting process of a function temporary pause state by a slave unit 200 in the second embodiment of the present technology.

(Example of Operation of Slave Unit)
FIG. 13 is a flow chart depicting an example of a processing procedure of a setting process of a function temporary pause state by the slave unit 200 in the second embodiment of the present technology. FIG. 13 depicts an example of a case in which the slave unit 200 is in a function temporary pause state on the basis of the function temporary pause period set in advance similarly as in the example depicted in FIG. 11.

First, the control section of the slave unit 200 (control section 150 depicted in FIG. 2) cancels the function temporary pause state of the slave unit 200 (step S851).

Then, the control section of the slave unit 200 decides whether or not it is necessary to issue a function temporary pause period adjustment request regarding the function temporary pause period set in the preceding operation cycle (steps S852, S854 and S856).

In this decision, it is decided whether or not the function temporary pause period set in the preceding operation cycle is appropriate, for example, to a permissible delay time period of the traffic of the slave unit 200, the amount of data buffered in the slave unit 200, a request from an upper layer and the power supply state of the slave unit 200.

For example, where voice call data for which the permissible delay time period of the traffic is short is handled, the control section of the slave unit 200 decides to request to reduce the function temporary pause period (steps S852 and S853). Further, for example, where the amount of data buffered in the slave unit 200 is great, the control section of the slave unit 200 decides to request to reduce the function temporary pause period (steps S852 and S853). Further, for example, when a request to raise the communication frequency is received from an upper layer, the control section of the slave unit 200 decides to request to reduce the function temporary pause period (steps S852 and S853).

On the other hand, for example, where the remaining battery capacity is low as the power supply state of the slave unit 200, the control section of the slave unit 200 decides to request to extend the function temporary pause period (steps S854 and S855).

Further, for example, if it is necessary to maintain the function temporary pause period even in a case that does not correspond to any of the cases described above, it is decided to request to maintain the function temporary pause period set in the preceding operation cycle (steps S856 and S857).

On the other hand, for example, if it is not necessary to maintain the function temporary pause period in a case that does not correspond to any of the cases described above (step S856), the processing advances to step S860.

When it is decided to request one of reduction, extension and maintenance of the function temporary pause period in this manner (steps S852 to S857), the control section of the slave unit 200 sets a function temporary pause period adjustment request (step S858).

Then, the control section of the slave unit 200 issues a notification of the function temporary pause period adjustment request information to the base station 100 (step S859). It is to be noted that, where it is not necessary to maintain the function temporary pause period (step S856), the control section of the slave unit 200 does not issue a notification.

Then, the control section of the slave unit 200 decides whether or not a function temporary pause period is received from the base station 100 (step S860). If no function temporary pause period is received (step S860), then the monitoring is performed continuously.

If a function temporary pause period is received (step S860), then the control section of the slave unit 200 enters a function temporary pause state on the basis of the function temporary pause period notified from the base station 100 (step S861).

In this manner, for example, the control section of the slave unit 200 (corresponding to the control section 150) performs control for notifying the base station 100 of a function temporary pause period adjustment request. In this case, the control section of the slave unit 200 can notify the base station 100 of an adjustment request, for example, based on the traffic of the slave unit 200. Further, the control section of the slave unit 200 can notify the base station 100 of an adjustment request, for example, based on a request from an upper layer to the slave unit 200. Further, the control section of the slave unit 200 can notify the base station 100 of an adjustment request, for example, based on the amount of data buffered in the slave unit 200. Further, the control section of the slave unit 200 can notify the base station 100 of an adjustment request, for example, based on the power supply state of the slave unit 200. Further, the control section of the slave unit 200 can notify the base station 100 of at least one of the adjustment requests described above.

For example, the control section of the slave unit 200 can decide, after the function temporary pause period is cancelled, one of reduction, extension and maintenance of the function temporary pause period. In this case, the control section of the slave unit 200 can make the decision on the basis of at least one of the traffic of the slave unit 200, a request from an upper layer to the slave unit 200, the amount of data buffered in the slave unit 200 and the power supply state of the slave unit 200. Then, the control section of the slave unit 200 performs control for issuing a notification of the substance of the decision as an adjustment request for a function temporary pause period to the base station 100.

Further, for example, the control section 150 of the base station 100 performs control for acquiring an adjustment request for a function temporary pause period from the slave unit 200 as information relating to the slave unit 200 and setting a function temporary pause period on the basis of the information. In particular, the control section 150 of the base station 100 performs control for setting a function temporary pause period to be set after cancellation of the function temporary pause period set by the slave unit 200 in response to the notification to the slave unit 200 on the basis of the information.

In this manner, according to the second embodiment of the present technology, the base station 100 can confirm whether or not a function temporary pause period is appropriate for the slave unit 200 by confirming function temporary pause period adjustment request information transmitted from the slave unit 200.

3. Third Embodiment

In a third embodiment of the present technology, an example is described in which a function temporary pause period for a base station is set on the basis of information (decision information) that can be acquired from data received from a slave unit.

It is to be noted that the configuration of each apparatus in the third embodiment of the present technology is substantially same as that of the base station 100 and the slave units 200 and 201 depicted in FIG. 1, FIG. 2 and so forth. Further, definitions of a function temporary pause function, function temporary pause function information and function temporary pause period information are similar to those in the first embodiment of the present technology. Therefore, elements same as those of the first embodiment of the present technology are denoted by the same reference signs, and part of description of them is omitted herein.

Further, also for frames to be exchanged between the base station 100 and the slave unit 200, similar frames to those in the first embodiment of the present technology can be used. For example, for a frame that is used when the base station 100 issues a request for function temporary pause function information and a frame that is used when the slave unit 200 issues a notification for function temporary pause function information, frames similar to those used in the first embodiment of the present technology can be used. Further, for a frame that is used when the base station 100 notifies the slave unit 200 of a function temporary pause period, for example, a frame similar to that used in the first embodiment of the present technology can be used. Also for the IE included in those frames, for example, an IE similar to that used in the first embodiment of the present technology can be used.

(Example of Setting of Function Temporary Pause State)

Figure 14:
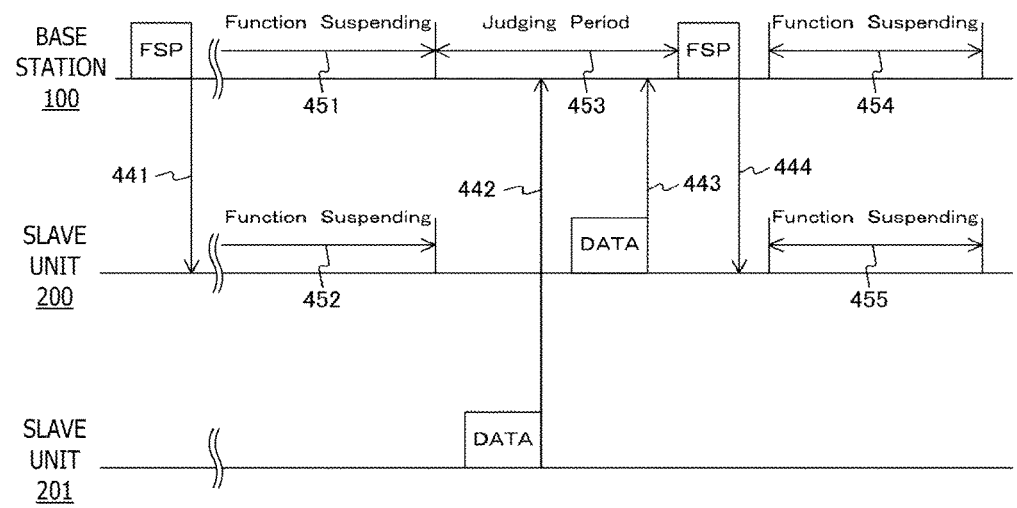
FIG. 14 is a view schematically depicting data exchanged between different apparatus and a period of a function temporary pause state in each of the different apparatus in a third embodiment of the present technology.

FIG. 14 is a view schematically depicting data exchanged between different apparatus and a period of a function temporary pause state in each apparatus in the third embodiment of the present technology.

FIG. 14 depicts an example of a case in which the slave unit 200 and the slave unit 201 that retain data to be transmitted to the base station 100 are connected to the base station 100. Further, FIG. 14 depicts an example of a case in which the function temporary pause period set to the slave unit 200 by the base station 100 is same as the function temporary pause period of the base station 100.

In FIG. 14, it is assumed that a notification of function temporary pause function information is issued from the slave unit 200 to the base station 100, and the base station 100 receives the function temporary pause function information from the slave unit 200 in advance.

Further, it is assumed that, on the basis of the function temporary pause period set in advance by a suitable method, the base station 100 and the slave unit 200 have entered a function temporary pause state (451 and 452). In particular, the base station 100 notifies the slave unit 200 of the set function temporary pause period (441). Then, the base station 100 and the slave unit 200 enter a function temporary pause state and maintain a function temporary pause state during the function temporary pause period (451 and 452).

Further, the base station 100 and the slave unit 200 cancel the function temporary pause state at a point of time at which the function temporary pause state is to be canceled on the basis of the function temporary pause period information notified from the base station 100 (451 and 452).

After the function temporary pause state is cancelled (452), the slave unit 200 transmits data to the base station 100 (443). Meanwhile, the slave unit 201 transmits data to the base station 100 (442). Then, the base station 100 receives the data from the slave unit 200 and the slave unit 201.

After the function temporary pause state is cancelled (451), the base station 100 enters a decision period (453). This decision period (453) can be at least part of a period after the function temporary pause state is cancelled until a function temporary pause period for the next operation cycle is set.

Further, the base station 100 sets, on the basis of information that can be discriminated from data received within the decision period (453), a period within which the own apparatus temporarily pauses its function. In particular, the base station 100 uses the data received within the decision period (453) as decision information for setting a period within which the own apparatus temporarily pauses its function.

Then, the base station 100 notifies the slave unit 200 of the set function temporary pause period (444).

The base station 100 enters a function temporary pause state at the point of time which has been notified to the slave unit 200 and at which the base station 100 is to enter a function temporary pause state and maintains the function temporary pause state for the function temporary pause period (454).

Further, the slave unit 200 enters a function temporary pause state at the point of time which has been notified from the base station 100 and at which the slave unit 200 is to enter a function temporary pause state and maintains the function temporary pause state for the function temporary pause period (455).

In FIG. 14, an example of a case in which the two slave units 200 and 201 are connected to the base station 100 is indicated. In this case, the base station 100 may perform request for function temporary pause function information and notification of a function temporary pause period individually for each slave unit or may perform them collectively for all slave units. Similarly, also where a three or more slave units are connected to the base station 100, request for function temporary pause function information and notification of a function temporary pause period may be performed individually for each slave unit or may be performed collectively for all slave units.

(Example of Operation of Base Station)

Figure 15:
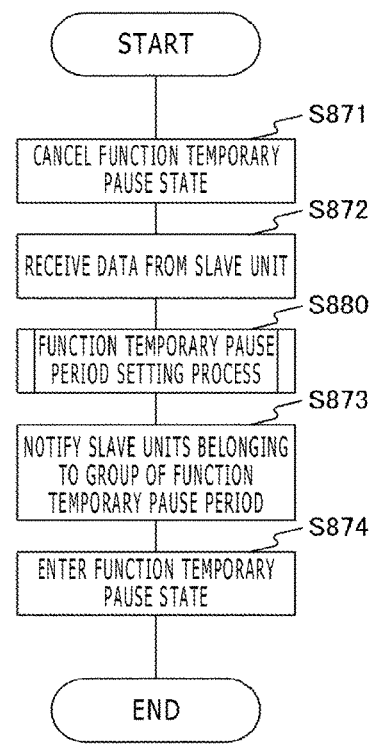
FIG. 15 is a flow chart depicting an example of a processing procedure of a setting process of a function temporary pause state by a base station 100 in the third embodiment of the present technology.

FIG. 15 is a flow chart depicting an example of a processing procedure of a setting process of a function temporary pause state by the base station 100 in the third embodiment of the present technology. FIG. 15 depicts an example of a case in which the base station 100 is in a function temporary pause state on the basis of a function temporary pause period set in advance similarly as in the example depicted in FIG. 14.

First, the control section 150 cancels the function temporary pause state of the base station 100 (step S871). Then, the control section 150 receives data transmitted from a slave unit (step S872). For example, as depicted in FIG. 14, after the function temporary pause state is cancelled, the control section 150 enters a decision period (453) and receives data from a slave unit (step S872).

Then, the control section 150 performs a function temporary pause period setting process (step S880). The function temporary pause period setting process is hereinafter described in detail with reference to FIG. 16.

Then, the control section 150 notifies the slave units belonging to the group of the base station 100 of the function temporary pause period set by the function temporary pause period setting process (step S873). Then, the control section 150 enters a function temporary pause state on the basis of the function temporary pause period set by the function temporary pause period setting process (step S874).

Figure 16:
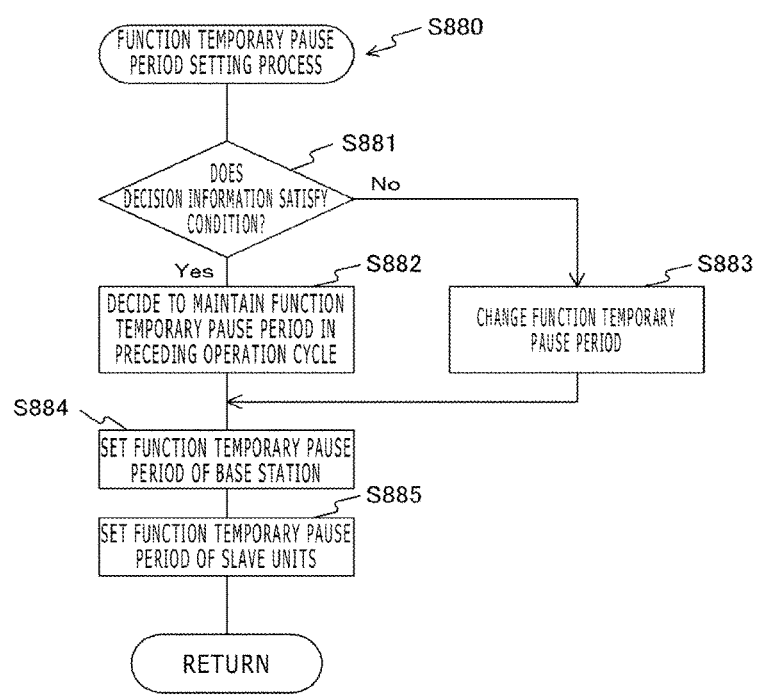
FIG. 16 is a flow chart depicting an example of a function temporary pause period setting process in the setting process of the function temporary pause state by the base station 100 in the third embodiment of the present technology.

FIG. 16 is a flow chart depicting an example of the function temporary pause period setting process (step S880 depicted in FIG. 15) in the setting process of a function temporary pause state by the base station 100 in the third embodiment of the present technology.

First, the control section 150 decides whether or not decision information satisfies a condition (step S881). Then, if the decision information satisfies the condition (step S881), then the control section 150 decides that the function temporary pause period in the preceding operation cycle is to be maintained for the next operation cycle (step S882). On the other hand, if the decision information does not satisfy the condition (step S881), then the control section 150 decides to change the function temporary pause period for the next operation cycle (step S883).

Then, the control section 150 sets a function temporary pause period for the own apparatus (base station 100) on the basis of a result of the decision (step S884).

Then, the control section 150 sets a function temporary pause period for the slave units belonging to the group of the base station 100 (step S885). For example, the function temporary pause period for the base station 100 and the function temporary pause period for the slave unit 200 may be set equal to each other.

Here, the decision information described above is information that can be acquired from data received from the slave units within the decision period. For example, the decision information may be at least one of resending information of data transmitted from a slave unit, a modulation method and an encoding method used for the transmission by the slave unit, reception power of the data transmitted from the slave unit, a period of time after an end of the function temporary pause period in the preceding operation cycle to reception of data transmitted from the slave unit and information of data transmitted from the slave unit regarding the order associated with previous data and subsequent data. Now, an example of decision in which each of the kinds of decision information described above is described.

(Example in which Resending Information of Data Transmitted from Slave Unit is Used)

The control section 150 decides whether or not resending information of data received from a slave unit within the decision period satisfies a condition determined in advance (step S881).

For example, the ratio of data sent by resending in data received from a slave unit within the decision period can be used as the resending information. In this case, for example, when the ratio of data sent by resending is low with reference to a threshold value (fourth threshold value), it can be decided that the decision information satisfies the condition.

Then, if the decision information satisfies the condition (step S881), then the control section 150 decides that the function temporary pause period in the preceding operation cycle is to be maintained in the next operation cycle (S882). On the other hand, if the decision information does not satisfy the condition (step S881), then the control section 150 decides to change the function temporary pause period for the next operation cycle (step S883).

For example, when the ratio of data sent by resending in data received from the slave unit within the decision period is high with reference to the threshold value (fourth threshold value) (for example, where the ratio is equal to or higher than the fourth threshold value), the decision information does not satisfy the condition (step S881). In this case, it can be decided to reduce the function temporary pause period for the next operation cycle (step S883).

Further, for example, the number of times of resending regarding data received from the slave unit within the decision period can be used as the resending information. In this case, for example, if the number of times of resending is small with reference to a threshold value (fifth threshold value), then it is decided that the decision information satisfies the condition.

For example, when the number of times of resending regarding data received from the slave unit within the decision period is great with reference to a reference provided by a threshold value (fifth threshold value) (for example, when the number of times of resending is equal to or greater than the fifth threshold value), the decision information does not satisfy the condition (step S881). In this case, it can be decided to reduce the function temporary pause period for the next operation cycle (step S883).

Further, where a plurality of slave units are connected to the base station 100, whether or not the decision information satisfies the condition may be decided, for example, on the basis of whether or not the number of slave units that have performed resending (or the ratio of such slave units to all slave units) is great with reference to a threshold value determined in advance. Alternatively, whether or not the decision information satisfies the condition may be decided, for example, on the basis of whether or not the ratio of the number of slave units that have performed resending to the number of slave units that have not performed resending is high with reference to a threshold value determined in advance.

In this manner, the base station 100 can grasp that the slave units connected to the own apparatus have transmitted data within the function temporary pause period of the own apparatus. In this case, the base station 100 can reduce the function temporary pause period for the next operation cycle.

(Example in which Modulation Method or Encoding Method Used for Transmission by Slave Unit or Reception Power of Data is Used)

The control section 150 decides whether or not the modulation method, the encoding method or the reception power of the data received from the slave unit within the decision period satisfies a condition determined in advance (step S881).

For example, the modulation method or the encoding method of the data received from the slave unit within the decision period is equivalent to or is an accelerated value of a threshold value (sixth threshold value) determined in advance, it can be decided that the decision information satisfies the condition.

For example, if the modulation method or the encoding method of the data received from the slave unit within the decision period is a slower value than the threshold value (sixth threshold value) determined in advance, then the decision information does not satisfy the condition (step S881). In this case, it can be decided to reduce the function temporary pause period for the next operation cycle (step S883).

Further, for example, if the reception power of the data received from the slave unit within the decision period is equivalent to or is reduced from a threshold value (seventh threshold value) determined in advance, then it can be decided that the decision information satisfies the condition.

For example, if the reception power of the data received from the slave unit within the decision period is increased from the threshold value (seventh threshold value) determined in advance, then the decision information does not satisfy the condition (step S881). In this case, it can be decided to reduce the function temporary pause period for the next operation cycle (step S883).

Further, where a plurality of slave units are connected to the base station 100, whether or not the decision information satisfies the condition may be decided on the basis of, for example, whether the number of slave units for which reduction in speed of the modulation method or the encoding method has been performed (or the ratio of such slave units to all slave units) is great with reference to a threshold value determined in advance.

Alternatively, whether or not the decision information satisfies the condition may be decided, for example, on the basis of whether or not the ratio of the number of slave units for which reduction in speed of the modulation method and the encoding method has been performed to the number of slave units for which reduction in speed of the modulation method and the encoding method has not been performed is high with reference to a threshold value determined in advance.

Further, where a plurality of slave units are connected to the base station 100, whether or not the decision information satisfies the condition may be decided, for example, on the basis of whether or not the number of slave units for which increase in output power of the signal power has been performed (or the ratio of such slave units to all slave units) is great with reference to a threshold value determined in advance. Alternatively, whether or not the decision information satisfies the condition may be decided, for example, on the basis of whether or not the ratio of the number of slave units for which increase in output power of the signal power has been performed to the number of slave units for which increase in output power of the signal power has not been performed is high with reference to a threshold value determined in advance.

In this manner, the base station 100 can recognize that, since, although a slave unit connected to the own apparatus transmits data within a function temporary pause period of the own apparatus, it is not received by the own apparatus, rate adaptation or transmit power control has been performed. In this case, the base station 100 can reduce the function temporary pause period for the next operation cycle.

(Example in which Period of Time after End of Function Temporary Pause Period in Preceding Operation Cycle Till Reception of Data Transmitted from Slave Unit is Used)

The control section 150 decides whether or not the reception timing of the data received from a slave unit within the decision period satisfies a condition determined in advance (step S881).

For example, it is decided whether or not data received within the decision period is sent by resending and besides the period between the reception timing and a point of time at which the function temporary pause state in the preceding operation cycle is cancelled is longer than a threshold value determined in advance. Then, if the data is resent data and besides the period is longer than the threshold value determined in advance, then it can be decided that the decision information does not satisfy the condition (step S881). In this case, it can be decided that the function temporary pause period in the next operation cycle is to be reduced (step S883). It is to be noted that the resending of data can be decided on the basis of whether or not a retry bit is in a set state.

In this manner, it can be estimated that a slave unit decides that the resending of data, which arises from the fact that the base station 100 is in a function temporary pause state, is caused by collision of data transmission and a collision avoidance algorithm functions to increase the transmission interval. Consequently, the base station 100 can indirectly recognize that resending of data has occurred.

Further, for example, where a plurality of slave units are connected to the base station 100, whether or not the decision information satisfies the condition may be decided, for example, on the basis of whether or not the number of slave units by which the transmission interval is increased (or the ratio of such slave units to all slave units) is great with reference to a threshold value determined in advance. Alternatively, whether or not the decision information satisfies the condition may be decided, for example, on the basis of whether or not the ratio of the number of slave units by which the transmission interval is increased to the number of slave units by which the transmission interval is not increased is high with reference to a threshold value determined in advance.

In this manner, the base station 100 can grasp that, since, although a slave unit connected to the own apparatus has transmitted data within a function temporary pause period of the own apparatus, it is not received by the own apparatus, the waiting time period till transmission is elongated by a back off algorithm. In this case, the base station 100 can reduce the function temporary pause period for the next operation cycle.

(Example in which Information of Data Transmitted from Slave Unit Regarding Order Associated with Previous Data and Subsequent Data is Used)

The control section 150 decides whether or not information of data received from the slave unit within the decision period regarding the order associated with previous data and subsequent data satisfies a condition determined in advance (step S881).

For example, as information of data received from the slave unit within the decision period regarding the order associated with previous data and subsequent data, missing of a sequence number can be used. For example, a case in which no sequence number is missing can be determined as a case in which the condition is satisfied, but another case in which some sequence number is missing can be determined as a case in which the condition is not satisfied.

For example, if data received from a slave unit within the decision period indicate missing of some sequence number, then it is decided that the decision information does not satisfy the decision information (step S881). In this case, it can be decided to reduce the function temporary pause period for the next operation cycle (step S883).

Here, for example, if the base station 100 is in a function temporary pause state, then also it can be supposed that the slave unit (legacy apparatus) repetitively performs resending. Further, when resending cannot be performed, there is the possibility that the slave unit may finally decide that transmission is impossible and discard the data. In this manner, there is the possibility that, by resending of data arising from the fact that the base station 100 is in a function temporary pause state, the slave unit may finally decide that the transmission is impossible and may discard the data.

If the slave unit decides that transmission is impossible and discards data in this manner, then some sequence number will be missing. Therefore, when some sequence number is missing, the function temporary pause period for the next operation cycle is reduced to elongate the period within which the slave unit can transmit data. Consequently, discarding of data by the slave unit arising from the fact that the base station 100 is in a function temporary pause state can be reduced.

Further, where a plurality of slave units are connected to the base station 100, whether or not the decision information satisfies the condition may be decided, for example, on the basis of whether or not the number of slave units that indicate missing in order (or the ratio of such slave units to all slave units) is great with reference to a threshold value determined in advance. Alternatively, whether or not the decision information satisfies the condition may be decided, for example, on the basis of whether or not the ratio of the number of slave units that indicate missing in order to the number of slave units that indicate no missing in order is high with reference to a threshold value determined in advance.

In this manner, the base station 100 can grasp that, since, although a slave unit connected to the own apparatus has transmitted data within a function temporary pause period of the own apparatus, it has not be been received, the slave unit repeats resending and finally discards the data. In this case, the base station 100 can reduce the function temporary pause period for the next operation cycle.

In this manner, for example, the control section 150 of the base station 100 can acquire, as information regarding a slave unit, at least one of resending information of data transmitted from the slave unit, a modulation method or an encoding method used for the data transmission by the slave unit, reception power of the data transmitted from the slave unit, information regarding a period of time after an end timing of the function temporary pause period set in the preceding operation cycle to a reception timing of data transmitted from the slave unit and information of data transmitted from the slave unit regarding the order associated with previous data and subsequent data. Then, the control section 150 can perform control for setting a function temporary pause period on the basis of the acquired information.

(Example of Operation of Slave Unit)

Figure 17:
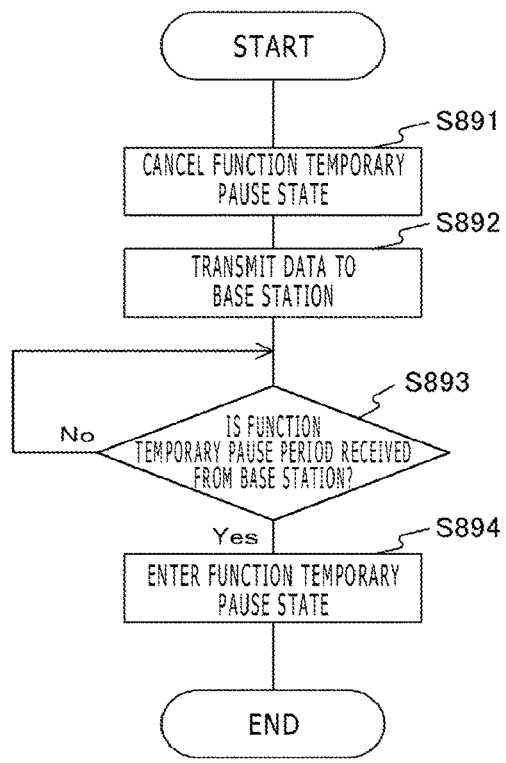
FIG. 17 is a flow chart depicting an example of a processing procedure of a setting process of a function temporary pause state by a slave unit 200 in the third embodiment of the present technology.

FIG. 17 is a flow chart depicting an example of a processing procedure of a setting process of a function temporary pause state by the slave unit 200 in the third embodiment of the present technology. FIG. 17 depicts an example of a case in which the slave unit 200 is in a function temporary pause state on the basis of the function temporary pause period set in advance similarly as in the example depicted in FIG. 14.

First, the control section of the slave unit 200 (control section 150 depicted in FIG. 2) cancels the function temporary pause state of the slave unit 200 (step S891).

Then, the control section of the slave unit 200 transmits data to the base station 100 (step S892). It is to be noted that, when data to be transmitted to the base station 100 does not exist, data transmission is not performed.

Then, the control section of the slave unit 200 decides whether or not a function temporary pause period is received from the base station 100 (step S893). If a function temporary pause period is not received (step S893), then the monitoring is performed continuously.

If a function temporary pause period is received (step S893), then the control section of the slave unit 200 enters a function temporary pause state on the basis of the function temporary pause period notified from the base station 100 (step S894).

Further, in the first to third embodiments of the present technology, the base station 100 may set a function temporary pause period of the own apparatus taking the power supply state of the own apparatus into consideration. For example, where the power supply of the base station 100 is a battery and the remaining battery capacity is low with reference to a threshold value, the function temporary pause period can be set long.

Here, for example, in a wireless LAN, a period during which a base station is in a Doze state in which the power consumption is low is prescribed in order to reduce the power consumption of the base station. However, where slave units connected to the base station include a slave unit that is not compatible in function, the base station cannot set a suitable Doze period. In those cases, the slave unit that is not compatible in function cannot recognize the Doze period of the base station, and there is the possibility that the slave unit may continue to resend the data.

Therefore, in the embodiments of the present technology, the Doze period of the base station is changed dynamically in response to information from the slave units connected to the base station 100. This information is, for example, function compatibility information, an extension permission, and a reduction request from the slave units, presence or absence of resending included in the information transmitted from the slave units, a modulation method, a sequence number, a reception timing after a Doze period of the base station ends, and so forth.

In this manner, in the embodiments of the present technology, the power consumption of the base station 100 can be reduced by performing dynamic adjustment of the Doze period. Further, power saving, carrying out of a function for a different group, search for a different group and enhancement in opportunity of them in the base station 100 and maintenance of a packet loss rate of a slave unit can be simultaneously satisfied.

For example, in a situation in which a slave unit that does not have the function temporary pause function is connected to a base station and it is not guaranteed that a base station that can be connected exists other than the base station, it is made possible for the base station to enter a power saving state. For example, the possibility that, in a situation in which reception and response are disabled because the base station enters a power saving state, a slave unit that cannot understand this may transmit data to the base station and repeat, because a response from the base station is not received, resending of the data can be reduced. As a result, the possibility that the slave unit may finally discard the data can be reduced.

Further, the base station 100 and the slave unit 200 in the embodiments of the present technology can be applied to apparatus used in various fields. For example, they can be applied to wireless apparatus used in an automobile (for example, a car navigation apparatus or a smartphone). Further, for example, they can be applied to learning apparatus used in the education field (for example, a tablet terminal). Further, they can be applied, for example, to wireless apparatus used in the agriculture field (for example, a terminal of a cattle management system). Similarly, for example, they can be applied to various wireless apparatus that are used in the sport field, medial field and so forth.

4. Application Examples

The technology according to the present disclosure can be applied to various products. For example, the base station 100 and the slave unit 200 can each be implemented as a mobile terminal such as a smartphone, a tablet personal computer (PC), a notebook PC, a portable game terminal or a digital camera, as a fixed terminal such as a television receiver, a printer, a digital scanner or a network storage or as an in-vehicle terminal such as a car navigation apparatus. Further, the base station 100 and the slave unit 200 may each be implemented as a terminal that performs machine-to-machine (M2M) communication (the terminal is also called machine type communication (MTC) terminal) such as a smart meter, a vending machine, a remote monitoring apparatus or a point of sale (POS) terminal. Furthermore, the base station 100 and the slave unit 200 may each be a wireless communication module (for example, an integrated circuit module configured by one die) incorporated in the terminals described above.

Meanwhile, for example, the base station 100 may be implemented as a wireless LAN access point (also called wireless base station) that has a router function or does not have a router function. Further, the base station 100 may be implemented as a mobile wireless LAN router. Furthermore, the base station 100 may be a wireless communication module (for example, an integrated circuit module configured by one die) incorporated in the apparatus described above.

4-1. First Application Example

Figure 18:
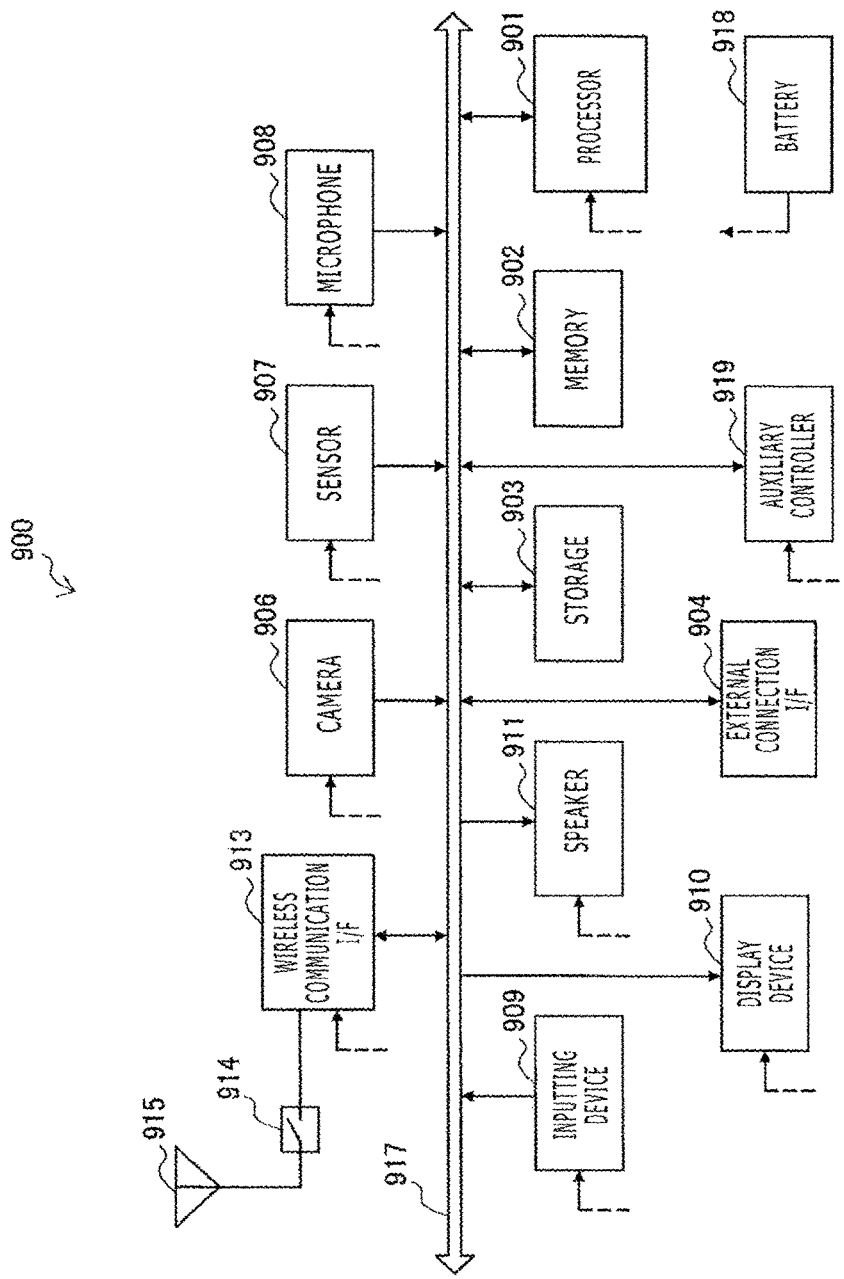
FIG. 18 is a block diagram depicting an example of a schematic configuration of a smartphone.

FIG. 18 is a block diagram depicting an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an inputting device 909, a display device 910, a speaker 911, a wireless communication interface 913, an antenna switch 914, an antenna 915, a bus 917, a battery 918 and an auxiliary controller 919.

The processor 901 may be, for example, a central processing unit (CPU) or a system on chip (SoC) and controls functions of an application layer and other layers of the smartphone 900. The memory 902 includes a random access memory (RAM) and a ROM and stores programs to be executed by the processor 901 and data. The storage 903 can include a storage medium such as a semiconductor memory or a hard disk. The external connection interface 904 is an interface for connecting an external device such as a memory card or a universal serial bus (USB) device to the smartphone 900.

The camera 906 has an image pickup element such as a charge coupled device (CCD) image pickup element or a complementary metal oxide semiconductor (CMOS) image pickup element and generates a picked up image. The sensor 907 can include a sensor group, for example, including a position sensor, a gyro sensor, a geomagnetism sensor and an acceleration sensor. The microphone 908 converts sound inputted to the smartphone 900 into a sound signal. The inputting device 909 includes, for example, a touch sensor for detecting a touch with a screen of the display device 910, a keypad, a keyboard, a button or a switch and accepts an operation or an information input from a user. The display device 910 has a screen of a liquid crystal display (LCD), an organic light emitting diode (OLED) display or the like and displays an output image of the smartphone 900. The speaker 911 converts a sound signal outputted from the smartphone 900 into sound.

The wireless communication interface 913 supports one or more of wireless LAN standards such as IEEE802.11a, 11b, 11g, 11n, 11ac and 11ad and executes wireless communication. The wireless communication interface 913 can communicate, in an infrastructure mode, with a different apparatus through a wireless LAN access point. Further, the wireless communication interface 913 can communicate, in a direct communication mode such as an ad hoc mode or Wi-Fi Direct, directly with a different apparatus. It is to be noted that, although, different from an ad hoc mode, in Wi-Fi Direct, one of two terminals operates as an access point, communication is performed directly between the terminals. The wireless communication interface 913 can typically include a baseband processor, a radio frequency (RF) circuit, a power amplifier and so forth. The wireless communication interface 913 may be a one-chip module in which a memory for storing a communication controlling program, a processor for executing the program and related circuits are integrated. The wireless communication interface 913 may support, in addition to a wireless LAN method, some other wireless communication method such as a short-range wireless communication method, a close proximity wireless communication method or a cellular communication method. The antenna switch 914 switches the connection destination of the antenna 915 between or among a plurality of circuits (for example, circuits for different wireless communication methods) included in the wireless communication interface 913. The antenna 915 has a single or a plurality of antenna elements (for example, a plurality of antenna elements configuring a multiple-input and multiple-output (MIMO) antenna) and is used for transmission and reception of a wireless signal by the wireless communication interface 913.

It is to be noted that the smartphone 900 is not limited to the example of FIG. 18 but may include a plurality of antennae (for example, an antenna for a wireless LAN, an antenna for a close proximity wireless communication method, and so forth). In this case, the antenna switch 914 may be omitted from the configuration of the smartphone 900.

The bus 917 connects the processor 901, memory 902, storage 903, external connection interface 904, camera 906, sensor 907, microphone 908, inputting device 909, display device 910, speaker 911, wireless communication interface 913 and auxiliary controller 919 to each other. The battery 918 supplies electric power to the blocks of the smartphone 900 depicted in FIG. 18 through a feed line partially indicated by a broken line in FIG. 18. The auxiliary controller 919 causes, for example, in a sleep mode, minimum required functions of the smartphone 900 to operate.

In the smartphone 900 depicted in FIG. 18, the control section 150 described hereinabove with reference to FIG. 2 may be incorporated in the wireless communication interface 913. Further, at least some of the functions may be incorporated in the processor 901 or the auxiliary controller 919. For example, if the smartphone 900 sets a function temporary pause state, then it can reduce the power consumption of the battery 918.

It is to be noted that the smartphone 900 may operate as a wireless access point (software AP) by causing the processor 901 to execute an access point function on the application level. Alternatively, the wireless communication interface 913 may have a wireless access point function.

4-2. Second Application Example

Figure 19:
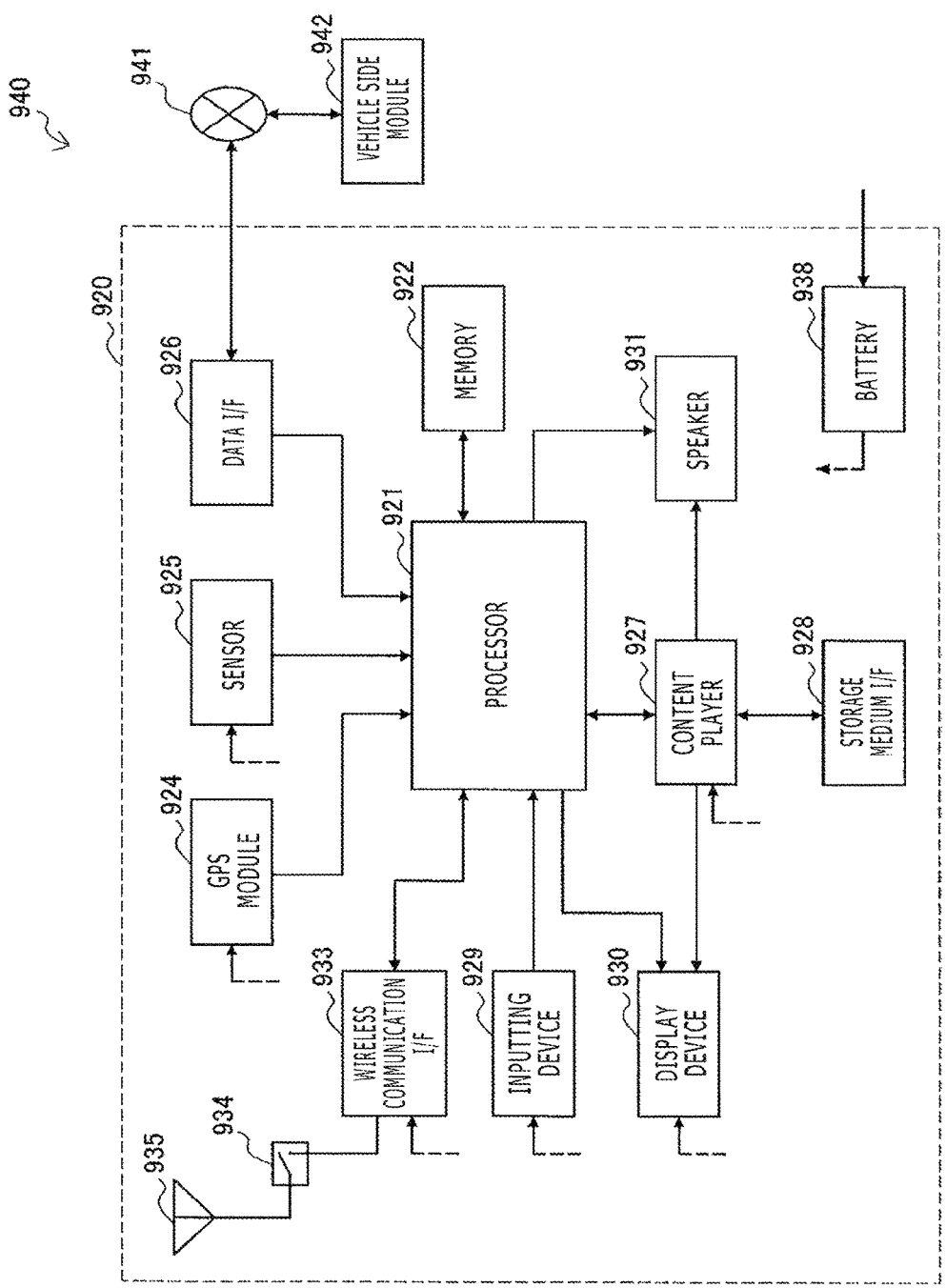
FIG. 19 is a block diagram depicting an example of a schematic configuration of a car navigation apparatus.

FIG. 19 is a block diagram depicting an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an inputting device 929, a display device 930, a speaker 931, a wireless communication interface 933, an antenna switch 934, an antenna 935 and a battery 938.

The processor 921 may be, for example, a CPU or an SoC and controls a navigation function and other functions of the car navigation apparatus 920. The memory 922 includes a RAM and a ROM and stores programs to be executed by the processor 921 and data.

The GPS module 924 measures the position of the car navigation apparatus 920 (for example, latitude, longitude and altitude) using GPS signals received from GPS satellites. The sensor 925 can include a sensor group, for example, including a gyro sensor, a geomagnetism sensor and an atmospheric pressure sensor. The data interface 926 is connected, for example, to an in-vehicle network 941 through a terminal not depicted and acquires data generated by the vehicle side such as vehicle speed data.

The content player 927 reproduces a content stored in a storage medium (for example, a CD or a DVD) inserted in the storage medium interface 928. The inputting device 929 includes, for example, a touch sensor that detects a touch with a screen of the display device 930, a button, a switch and so forth and accepts an operation or an information input from a user. The display device 930 has a screen of an LCD or OLED display or the like and displays an image of a navigation function or an image of a reproduced content. The speaker 931 outputs sound of the navigation function or of a reproduced content.

The wireless communication interface 933 supports one or more of wireless LAN standards such as IEEE802.11a, 11b, 11g, 11n, 11ac and 11ad and executes wireless communication. The wireless communication interface 933 can communicate, in an infrastructure mode, with a different apparatus through a wireless LAN access point. Further, the wireless communication interface 933 can communicate, in a direct communication mode such as an ad hoc mode or Wi-Fi Direct, directly with a different apparatus. The wireless communication interface 933 can typically include a baseband processor, an RF circuit, a power amplifier and so forth. The wireless communication interface 933 may be a one-chip module in which a memory for storing a communication controlling program, a processor for executing the program and related circuits are integrated. The wireless communication interface 933 may support, in addition to a wireless LAN method, some other wireless communication method such as a short-range wireless communication method, a close proximity wireless communication method or a cellular communication method. The antenna switch 934 switches the connection destination of the antenna 935 between or among a plurality of circuits included in the wireless communication interface 933. The antenna 935 has a single or a plurality of antenna elements and is used for transmission and reception of a wireless signal by the wireless communication interface 933.

It is to be noted that the car navigation apparatus 920 is not limited to the example of FIG. 19 but may include a plurality of antennae. In this case, the antenna switch 934 may be omitted from the configuration of the car navigation apparatus 920.

The battery 938 supplies electric power to the blocks of the car navigation apparatus 920 depicted in FIG. 19 through a feed line partially depicted by a broken line in FIG. 19. Further, the battery 938 accumulates electric power fed from the vehicle side.

In the car navigation apparatus 920 depicted in FIG. 19, the control section 150 described hereinabove with reference to FIG. 2 may be incorporated in the wireless communication interface 933. Further, at least some of the functions may be incorporated in the processor 921.

Further, the wireless communication interface 933 may operate as the base station 100 described hereinabove and provide wireless connection to a terminal which a user who rides on a vehicle has.

Further, the technology according to the present disclosure may be implemented as an in-vehicle system (or vehicle) 940 including one or more of the blocks of the car navigation apparatus 920 described above, the in-vehicle network 941 and a vehicle side module 942. The vehicle side module 942 generates vehicle side data such as a vehicle speed, an engine speed or failure information and outputs the generated data to the in-vehicle network 941.

4-3. Third Application Example

Figure 20:
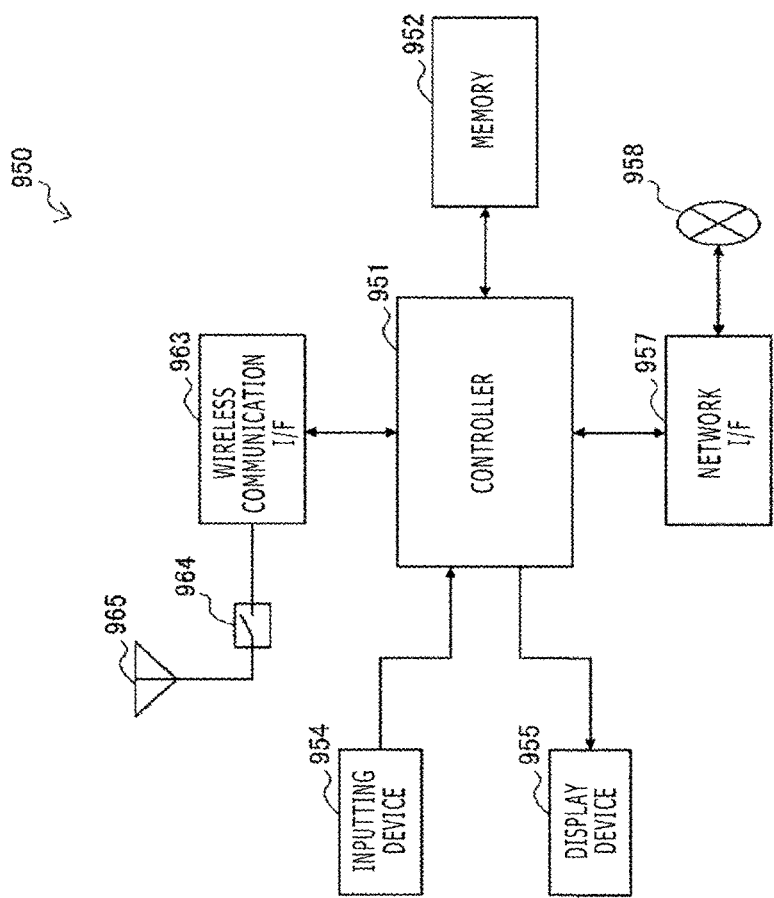
FIG. 20 is a block diagram depicting an example of a schematic configuration of a wireless access point.

FIG. 20 is a block diagram depicting an example of a schematic configuration of a wireless access point 950 to which the technology according to the present disclosure can be applied. The wireless access point 950 includes a controller 951, a memory 952, an inputting device 954, a display device 955, a network interface 957, a wireless communication interface 963, an antenna switch 964 and an antenna 965.

The controller 951 may be, for example, a CPU or a digital signal processor (DSP) and causes various functions (for example, for access restriction, routing, encryption, firewall, log management and so forth) of the Internet protocol (IP) layer and upper layers of the wireless access point 950 to operate. The memory 952 includes a RAM and a ROM and stores programs to be executed by the controller 951 and various kinds of control data (for example, a terminal list, a routing table, an encryption key, security setting, a log and so forth).

The inputting device 954 includes, for example, a button, a switch and so forth and accepts an operation from a user. The display device 955 includes an LED lamp or the like and displays an operation status of the wireless access point 950.

The network interface 957 is a wired communication interface for allowing the wireless access point 950 to be connected to a wired communication network 958. The network interface 957 may have a plurality of connection terminals. The wired communication network 958 may be a LAN such as the Ethernet (registered trademark) or may be a wide area network (WAN).

The wireless communication interface 963 supports one or more of wireless LAN standards such as IEEE802.11a, 11b, 11g, 11n, 11ac and 11ad and serves as an access point to neighboring terminals to provide wireless connection. The wireless communication interface 963 can typically include a baseband processor, an RF circuit, a power amplifier and so forth. The wireless communication interface 963 may be a one-chip module in which a memory for storing a communication controlling program, a processor for executing the program and related circuits are integrated. The antenna switch 964 switches the connection destination of the antenna 965 between or among a plurality of circuits included in the wireless communication interface 963. The antenna 965 has a single or a plurality of antenna elements and is used for transmission and reception of a wireless signal by the wireless communication interface 963.

In the wireless access point 950 depicted in FIG. 20, the control section 150 described hereinabove with reference to FIG. 2 may be incorporated in the wireless communication interface 963. Further, at least some of the functions may be incorporated in the controller 951.

It is to be noted that the embodiments described above indicate an example for embodying the present technology, and matters in the embodiments and matters to define the invention in the claims individually have a corresponding relation. Similarly, matters to define the invention in the claims and matters in the embodiments of the present technology having the same designations applied thereto individually have a corresponding relation. However, the present technology is not limited to the embodiments and can be embodied by modifying the embodiments in various manners without departing from the subject matter of the present technology.

Further, any of the processing procedures described hereinabove in connection with the above-described embodiments may be grasped as a method having the series of steps and may be grasped as a program for causing a computer to execute the series of steps or as a recording medium in which the program is stored. As the recording medium, for example, a CD, a mini disc (MD), a DVD, a memory card, a Blu-ray (registered trademark) disc and so forth can be used.

It is to be noted that the advantageous effects described herein are exemplary to the last and are not restrictive, and other advantages may be available.

It is to be noted that the present technology can take the following configurations.

(1)

An information processing apparatus, including:

a control section that performs control for setting, when at least some of functions of the own apparatus is to be temporarily paused, a function temporary pause period within which at least some of functions of a different apparatus is to be temporarily paused and notifying the different apparatus of the function temporary pause period.

(2)

The information processing apparatus according to (1) above, in which the control section performs control for acquiring information regarding the different apparatus and setting the function temporary pause period based on the information.

(3)

The information processing apparatus according to (2) above, in which the information is at least one of presence or absence of a function for setting the function temporary pause period in the different apparatus, the number of different apparatus connected to the information processing apparatus, an adjustment request for the function temporary pause period from the different apparatus, resending information of data transmitted from the different apparatus, a modulation method or an encoding method used for the data transmission by the different apparatus, reception power of the data transmitted from the different apparatus, information regarding a period of time after an end timing of the function temporary pause period set in a preceding operation cycle till a reception timing of the data transmitted from the different apparatus, and information of data transmitted from the different apparatus regarding an order associated with previous data and subsequent data.

(4)

The information processing apparatus according to (2) or (3) above, in which the control section performs control for setting, based on the information, the function temporary pause period to be set after the function temporary pause period set in response to the notification is cancelled.

(5)

The information processing apparatus according to any one of (1) to (4) above, in which the temporary pause of the information processing apparatus is at least one of a temporary pause for allowing the information processing apparatus to enter a power saving state, a temporary pause of functions other than a function for temporarily pausing a function of a group to which the information processing apparatus belongs while allowing a function of a group different from the group to be carried out, and a temporary pause of functions other than a function for temporarily pausing a function of the group to which the information processing apparatus belongs while searching for a new group to which the information processing apparatus is to belong.

(6)

The information processing apparatus according to any one of (1) to (5) above, in which the control section performs control for transmitting a frame for notification of the function temporary pause period to the different apparatus that has a specific function capable of understanding the frame.

(7)

The information processing apparatus according to (6) above, in which, when information regarding presence or absence of the specific function is not acquired from the different apparatus connected to the information processing apparatus, the control section performs control for requesting the different apparatus for the information regarding presence or absence of the specific function.

(8)

The information processing apparatus according to (7) above, in which, where a plurality of the different apparatus are connected to the information processing apparatus, the control section performs the notification of the function temporary pause period and the request for the information regarding presence or absence of the specific function by one of a first method by which the notification and the request are performed individually for each of the different apparatus and a second method by which the notification and the request are performed collectively for the plurality of different apparatus.

(9)

An information processing apparatus, including:

a control section that performs control for setting, based on a function temporary pause period notified, when at least some of functions of a different apparatus is to be temporarily paused, from the different apparatus, a period within which at least some of functions of the own apparatus is to be temporarily paused and notifying the different apparatus of an adjustment request for the function temporary pause period.

(10)

The information processing apparatus according to (9) above, in which the control section notifies the different apparatus of at least one of an adjustment request based on traffic of the information processing apparatus, an adjustment request based on a request from an upper layer to the information processing apparatus, an adjustment request based on an amount of data buffered in the information processing apparatus and an adjustment request based on a power supply state of the information processing apparatus.

(11)

The information processing apparatus according to (9) above, in which, after the function temporary pause period is cancelled, the control section decides, based on at least one of traffic of the information processing apparatus, a request from an upper layer to the information processing apparatus, an amount of data buffered in the information processing apparatus and a power supply state of the information processing apparatus, one of reduction, extension and maintenance of the function temporary pause period and performs control for notifying the different apparatus of a substance of the decision as an adjustment request for the function temporary pause period.

(12)

A communication system, including:

a first information processing apparatus that sets, when at least some of functions of the first information processing apparatus is to be temporarily paused, a function temporary pause period for temporarily pausing at least some of functions of a second information processing apparatus and notifies the second information processing apparatus of the function temporary pause period; and the second information processing apparatus that temporarily pauses, based on the function temporary pause period notified from the first information processing apparatus, at least some of the functions of the second information processing apparatus and notifies the first information processing apparatus of an adjustment request for the function temporary pause period.

(13)

An information processing method, including:

a control procedure for setting, when at least some of functions of an own apparatus is to be temporarily paused, a function temporary pause period within which at least some of functions of a different apparatus is to be temporarily paused and notifying the different apparatus of the function temporary pause period.

(14)

An information processing method, including:

a control procedure for setting, when at least some of functions of a different apparatus is to be temporarily paused, a period within which at least some of functions of an own apparatus is to be temporarily paused based on a function temporary pause period notified from the different apparatus and notifying the different apparatus of an adjustment request for the function temporary pause period.

(15)

A program for causing a computer to execute a control procedure for setting, when at least some of functions of an own apparatus is to be temporarily paused, a function temporary pause period within which at least some of functions of a different apparatus is to be temporarily paused and notifying the different apparatus of the function temporary pause period.

(16)

A program for causing a computer to execute a control procedure for setting, when at least some of functions of a different apparatus is to be temporarily paused, a period within which at least some of functions of an own apparatus is to be temporarily paused based on a function temporary pause period notified from the different apparatus and notifying the different apparatus of an adjustment request for the function temporary pause period.

REFERENCE SIGNS LIST

10 Communication system
100 Base station (information processing apparatus)
110 Data processing section
120 Communication section
121 Modulation-demodulation section
122 Signal processing section
123, 124 Wireless interface section
125, 126 Amplification section
127, 128 Antenna
129 Channel estimation section
130 Storage section
140 Power supply section
150 Control section
200, 201 Slave unit (information processing apparatus)
900 Smartphone
901 Processor
902 Memory
903 Storage
904 External connection interface
906 Camera
907 Sensor
908 Microphone
909 Inputting device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Inputting device
930 Display device
931 Speaker
933 Wireless communication interface
934 Antenna switch
935 Antenna
938 Battery
941 In-vehicle network
942 Vehicle side module
950 Wireless access point
951 Controller
952 Memory
954 Inputting device
955 Display device
957 Network interface
958 Wired communication network
963 Wireless communication interface
964 Antenna switch
965 Antenna

The invention claimed is:

1. An information processing apparatus, comprising: processing circuitry configured to determine whether compatibility information regarding presence or absence of a specific function is acquired from a different apparatus connected to the information processing apparatus, the specific function being a compatibility function of understanding a frame for notifying the different apparatus of a function temporary pause period;

in response to determining the compatibility information regarding presence or absence of the specific function is not acquired from the different apparatus, perform control for requesting the different apparatus for the compatibility information regarding presence or absence of the specific function; and perform control for setting, when at least a part of functions for wireless communication of the information processing apparatus is to be temporarily paused, the function temporary pause period within which at least a part of functions for wireless communication of the different apparatus is to be temporarily paused and perform control for transmitting the frame for notifying the different apparatus of the function temporary pause period, in a case where the different apparatus is determined to have the specific function of understanding the frame based on the compatibility information regarding presence or absence of the specific function.

2. The information processing apparatus according to claim 1, wherein the processing circuitry performs control for acquiring information regarding the different apparatus and setting the function temporary pause period based on the information regarding the different apparatus.

3. The information processing apparatus according to claim 2, wherein the information regarding the different apparatus is at least one of presence or absence of a function for setting the function temporary pause period in the different apparatus, the number of different apparatus connected to the information processing apparatus, an adjustment request for the function temporary pause period from the different apparatus, resending information of data transmitted from the different apparatus, a modulation method or an encoding method used for the data transmission by the different apparatus, reception power of the data transmitted from the different apparatus, information regarding a period of time after an end timing of the function temporary pause period set in a preceding operation cycle till a reception timing of the data transmitted from the different apparatus, and information of data transmitted from the different apparatus regarding an order associated with previous data and subsequent data.

4. The information processing apparatus according to claim 2, wherein the processing circuitry performs control for setting, based on the information regarding the different apparatus, the function temporary pause period to be set after the function temporary pause period set in response to the notification is cancelled.

5. The information processing apparatus according to claim 1, wherein the temporary pause of the information processing apparatus is at least one of a temporary pause for allowing the information processing apparatus to enter a power saving state, a temporary pause of functions other than a function for temporarily pausing a function of a group to which the information processing apparatus belongs while allowing a function of a group different from the group to be carried out, and a temporary pause of functions other than a function for temporarily pausing a function of the group to which the information processing apparatus belongs while searching for a new group to which the information processing apparatus is to belong.

6. The information processing apparatus according to claim 1, wherein, where a plurality of the different apparatus are connected to the information processing apparatus, the processing circuitry performs the notification of the function temporary pause period and the request for the compatibility information regarding presence or absence of the specific function by one of a first method by which the notification and the request are performed individually for each of the different apparatus and a second method by which the notification and the request are performed collectively for the plurality of different apparatus.

7. An information processing apparatus, comprising:
processing circuitry configured to
perform control for receiving, from a different apparatus, a request for compatibility information regarding presence or absence of a specific function, the specific function being a function of understanding a frame for notifying the information processing apparatus of a function temporary pause period, the different apparatus transmitting the request to the information processing apparatus in response to determining the compatibility information regarding presence or absence of the specific function is not acquired from the information processing apparatus;

perform control for transmitting the compatibility information regarding presence or absence of the specific function to the different apparatus in response to receiving the request, the information indicating presence of the specific function in the information processing apparatus;

perform control for receiving, from the different apparatus, the frame for notifying the information processing apparatus of the function temporary pause period, the different apparatus transmitting the frame in response to determining the information processing apparatus has the specific function based on the compatibility information regarding presence or absence of the specific function;

perform control for setting, based on the function temporary pause period notified t the frame, when at least a part of functions for wireless communication of the different apparatus is to be temporarily paused, from the different apparatus, a period within which at least a part of functions for wireless communication of the information processing apparatus is to be temporarily paused and notifying the different apparatus of an adjustment request for the function temporary pause period.

8. The information processing apparatus according to claim 7, wherein the processing circuitry notifies the different apparatus of at least one of an adjustment request based on traffic of the information processing apparatus, an adjustment request based on a request from an upper layer to the information processing apparatus, an adjustment request based on an amount of data buffered in the information processing apparatus and an adjustment request based on a power supply state of the information processing apparatus.

9. The information processing apparatus according to claim 7, wherein, after the function temporary pause period is cancelled, the processing circuitry decides, based on at least one of traffic of the information processing apparatus, a request from an upper layer to the information processing apparatus, an amount of data buffered in the information processing apparatus and a power supply state of the information processing apparatus, one of reduction, extension and maintenance of the function temporary pause period and performs control for notifying the different apparatus of a substance of the decision as an adjustment request for the function temporary pause period.

10. An information processing method by an information processing apparatus, comprising:
determining, using processing circuitry of the information processing apparatus, whether compatibility information regarding presence or absence of a specific function is acquired from a different apparatus connected to the information processing apparatus, the specific function being a function of understanding a frame for notifying the different apparatus of a function temporary pause period;
in response to determining the compatibility information regarding presence or absence of the specific function is not acquired from the different apparatus, performing control for requesting the different apparatus for the compatibility information regarding presence or absence of the specific function; and
performing control for setting, when at least a part of functions for wireless communication of the information processing apparatus is to be temporarily paused, the function temporary pause period within which at least a part of functions for wireless communication of the different apparatus is to be temporarily paused and performing control for transmitting the frame for notifying the different apparatus of the function temporary pause period, in a case where the different apparatus is determined to have the specific function of understanding the frame based on the compatibility information regarding presence or absence of the specific function.

* * * * *